(12) United States Patent
Thorne et al.

(10) Patent No.: US 11,480,709 B2
(45) Date of Patent: Oct. 25, 2022

(54) SYSTEMS AND METHODS FOR PREDICTING HYDROCARBON PRODUCTION AND ASSESSING PREDICTION UNCERTAINTY

(71) Applicant: CHEVRON U.S.A. INC., San Ramon, CA (US)

(72) Inventors: Julian Thorne, Houston, TX (US); Lewis Li, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 559 days.

(21) Appl. No.: 16/659,518

(22) Filed: Oct. 21, 2019

(65) Prior Publication Data

US 2021/0116598 A1   Apr. 22, 2021

(51) Int. Cl.
*G01V 99/00* (2009.01)
*G06N 20/00* (2019.01)
(Continued)

(52) U.S. Cl.
CPC .............. *G01V 99/005* (2013.01); *G06N 5/04* (2013.01); *G06N 20/00* (2019.01); *G06N 3/086* (2013.01)

(58) Field of Classification Search
CPC ........ G01V 99/005; G06N 5/04; G06N 20/00; G06N 3/086; E21B 43/00; E21B 2200/22
See application file for complete search history.

(56) References Cited

U.S. PATENT DOCUMENTS 7,254,091 B1    8/2007  Gunning et al.
9,771,795 B2 *  9/2017  Knight ................. C12Q 1/6888
(Continued)

FOREIGN PATENT DOCUMENTS

EP    3406844    11/2018

OTHER PUBLICATIONS

Ertekin et al., "Artificial Intelligence Applications in Reservoir Engineering: A Status Check," Energies, vol. 12, No. 15, Jul. 27, 2019, 22 pages.

(Continued)

*Primary Examiner* — El Hadji M Sall
(74) *Attorney, Agent, or Firm* — Sheppard, Mullin, Richter & Hampton LLP

(57) ABSTRACT

Methods and systems for predicting hydrocarbon production and production uncertainty are disclosed. Exemplary implementations may: obtain training data, the training data including (i) training production data, (ii) training engineering parameters, and (iii) a training set of geological parameters and corresponding training geological parameter uncertainty values; obtain an initial production model; generate a trained production model by training the initial production model; store the trained production model; obtain a target set of geological parameters and corresponding target geological parameter uncertainty values and target engineering parameters; apply the trained production model to generate a set of production values and corresponding production uncertainty values; generate a representation using visual effects to depict at least a portion of the set of production values and corresponding production uncertainty values as a function of position within the subsurface volume of interest; and display the representation.

20 Claims, 20 Drawing Sheets
(16 of 20 Drawing Sheet(s) Filed in Color)

(51) Int. Cl.
*G06N 5/04* (2006.01)
*G06N 3/08* (2006.01)

(56) References Cited

U.S. PATENT DOCUMENTS

| | | | |
|---|---|---|---|
| 2004/0148147 A1* | 7/2004 | Martin | E21B 49/00 703/10 |
| 2007/0179768 A1 | 8/2007 | Cullick et al. | |
| 2009/0319243 A1 | 12/2009 | Suarez-Rivera et al. | |
| 2010/0138196 A1* | 6/2010 | Hui | E21B 43/00 703/1 |
| 2010/0185424 A1 | 7/2010 | Massonnat | |
| 2011/0011595 A1 | 1/2011 | Huang et al. | |
| 2012/0010865 A1 | 1/2012 | Benson | |
| 2013/0096897 A1 | 4/2013 | Shahri | |
| 2014/0310634 A1 | 10/2014 | Mclellan et al. | |
| 2014/0365409 A1 | 12/2014 | Burch et al. | |
| 2015/0284811 A1 | 10/2015 | Knight et al. | |
| 2016/0042272 A1* | 2/2016 | Mohaghegh | G06N 3/0472 706/19 |
| 2016/0215404 A1* | 7/2016 | Palmore | C25B 11/04 |
| 2016/0259088 A1 | 9/2016 | Carvajal | |
| 2016/0356125 A1 | 12/2016 | Bello et al. | |
| 2017/0108617 A1 | 4/2017 | Fei et al. | |
| 2018/0231681 A1 | 8/2018 | Katterbauer et al. | |
| 2018/0335538 A1* | 11/2018 | Dupont | G06Q 10/04 |
| 2019/0094403 A1 | 3/2019 | Prochnow et al. | |
| 2019/0094414 A1 | 3/2019 | Prochnow et al. | |
| 2019/0120998 A1 | 4/2019 | Prochnow et al. | |
| 2020/0033317 A1* | 1/2020 | Patel | C10G 75/02 |
| 2021/0109252 A1* | 4/2021 | Li | G06N 20/00 |

OTHER PUBLICATIONS

Mohaghegh et al., "Modeling, History Matching, Forecasting and Analysis of Shale Reservoirs Performance Using Artificial Intelligence," SPE Digital Entergy Conference and Exhibition, Jan. 1, 2011, 14 pages.

International Search Report and Written Opinion dated Feb. 23, 2021 for International Application No. PCT/US2020/056532, filed Oct. 20, 2020.

PCT International Search Report and Written Opinion, dated Dec. 6, 2018, issued in International Application No. PCT/US2018/050892, filed on Sep. 13, 2018, 10 pages.

PCT International Search Report and Written Opinion, dated Nov. 9, 2018, issued in International Application No. PCT/US2018/050639, filed on Sep. 12, 2018, 7 pages.

PCT International Search Report and Written Opinion, dated Nov. 15, 2018, issued in International Application No. PCT/US2018/050624, filed on Sep. 13, 2018, 9 pages.

Reis, Itamar et al., "Probabilistic Random Forest: A Machine Learning Algorithm for Noisy Data Sets." The Astronomical Journal 157.1 (2018): 16.

Loustau, Sebastien et al., "Minimax fast rates for discriminant analysis with errors in variables." Bernoulli 21.1 (2015): 176-208.

Schennach, Susanne M., "Recent advances in the measurement error literature." Annual Review of Economics 8 (2016): 341-377.

Lashin "Reservoir parameter estimation using well logging data and production history of the Kaldarholt geothermal field, S- Iceland", United Nations University., UNU Geothermal Training Programme, Iceland. Report; Dec. 2005, 2005. Retrieved on Oct. 26, 2018, Retrieved from internet <URL: https://rafhladan.is/handle/10802/7936> entire document. (38 pages).

Breiman, L., "Random Forests: Machine Learning," 45, 2001, pp. 5-12.

Prochnow, S.J. et al., "Spatial Continuity and Surveillance Recommendations in the Permian Basin Tight Rock Wolfcamp: Autocorrealtion and Vario Gram Analysis of Determining Extent of Reservoir Homogeneity," Unconventional Resources Technology Conference (URTeC) Manuscript 2669992, DOI 10.15530/urtec-2017-2669992, 17 pages.

Wicker, J. et al., "Multivariate Analytics of Seismic Inversion Products to Predict Horizontal Production in the Wolf camp Formation of the Midland Basin," Unconventional Resources Technology Conference, San Antonio, Texas, Aug. 2016, Paper URTeC: 2449798. 9 pages.

Zhong, M. et al., "Do Data-Mining Methods Matter? A Wolfcamp Shale Case Study," SPE Hydraulic Fracturing Technology Conference, The Woodlands, Texas, USA, Feb. 2015, SPE 173334, 12 pages.

* cited by examiner

SYSTEMS AND METHODS FOR PREDICTING HYDROCARBON PRODUCTION AND ASSESSING PREDICTION UNCERTAINTY

FIELD OF THE DISCLOSURE

The present disclosure relates to systems and methods for predicting hydrocarbon production and accurately assessing the corresponding predicted hydrocarbon production uncertainty.

SUMMARY

An aspect of the present disclosure relates a method for training a model using stochastic input parameters for predicting hydrocarbon production and hydrocarbon production uncertainty in a subsurface volume of interest. The method may be implemented in a computer system that includes one or more physical computer processors, non-transient electronic storage, and a graphical user interface. The method may include obtaining training data via the graphical user interface. The training data may include production data, corresponding to the subsurface volume of interest. The training data may include engineering parameters, corresponding to the subsurface volume of interest. The training data may also include a training set of geological parameters and corresponding training geological parameter uncertainty values, corresponding to the subsurface volume of interest. The method may include obtaining and training an initial production model using the training data. The method may include generating a trained production model based on the training data. The method may include storing the trained production model.

An aspect of the present disclosure relates a method for applying a model for predicting hydrocarbon production and hydrocarbon production uncertainty in a subsurface volume of interest. The method may be implemented in a computer system that includes one or more physical computer processors, non-transient electronic storage, and a graphical user interface. The method may include obtaining target data via a graphical user interface. The target data may include a set of geological parameters and corresponding geological parameter uncertainty values. The target data may also include engineering parameters. The method may include obtaining a trained production model. The trained production model may have been trained by training an initial production model. The training data may include production data, corresponding to the subsurface volume of interest. The training data may include engineering parameters, corresponding to the subsurface volume of interest. The training data may also include a training set of geological parameters and corresponding training geological parameter uncertainty values, corresponding to the subsurface volume of interest. The method may include applying the trained production model to the target data via the graphical user interface to generate a set of production values and corresponding production uncertainty values. The method may include generating a representation using visual effects to depict at least a portion of the set of production values and corresponding production uncertainty values as a function of position within the subsurface volume of interest. The method may include displaying the representation.

An aspect of the present disclosure relates a system for training and applying a model for predicting hydrocarbon production and hydrocarbon production uncertainty in a subsurface volume of interest. The system may include non-transient electronic storage, a graphical user interface; memory; one or more programs, and one or more physical computer processors configured by machine-readable instructions. The processor(s) may be configured to obtain, via the graphical user interface, training data. The training data may include production data, corresponding to the subsurface volume of interest. The training data may include engineering parameters, corresponding to the subsurface volume of interest. The training data may also include a training set of geological parameters and corresponding training geological parameter uncertainty values, corresponding to the subsurface volume of interest. The processor(s) may be configured to obtain an initial production model. The processor(s) may be configured to generate a trained production model by training, on the one or more physical computer processors using the training data, the initial production model. The processor(s) may be configured to store the trained production model. The processor(s) may be configured to obtain target data. The target data may include a set of geological parameters and corresponding geological parameter uncertainty values. The target data may also include engineering parameters. The processor(s) may be configured to apply the target data to the trained production model to generate a set of production values and corresponding production uncertainty values. The processor(s) may be configured to generate a representation using visual effects to depict at least a portion of the set of production values and corresponding production uncertainty values as a function of position within the subsurface volume of interest. The processor(s) may be configured to display the representation.

An aspect of the present disclosure relates to a system configured for using probability distributions of uncertain geologic features as input parameters in a machine learning algorithm. The system can be used to forecast production and uncertainty of production forecasts even when the input parameters are uncertain geological parameters. The system may include one or more physical computer processors configured by machine-readable instructions. The processor(s) may be configured to receive training data sets describing attributes of a subsurface volume of interest. The training data sets may include hydrocarbon production data, well data, engineering parameters, geological parameters, and geological parameter uncertainty values via a graphical user interface. The processor(s) may be configured to obtain and train a production model based on the received training data sets. In some various implementations, the production model may comprise a probabilistic random forest regression. The processor(s) may be configured to use the trained production model to predict hydrocarbon production and the uncertainty corresponding to the prediction. The production model may comprise a probabilistic random forest regression.

An aspect of the present disclosure relates to a non-transient computer-readable storage medium having instructions embodied thereon, the instructions being executable by one or more processors to perform a method that can be used to quantify uncertainty of production forecasts accounting for both uncertainty in the input variables (i.e., geological and engineering parameters' uncertainty), and in the regression itself (i.e., standard error).

These and other features, and characteristics of the present technology, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the presently disclosed technology. As used in the specification and in the claims, the singular form of 'a', 'an', and 'the' include plural referents unless the context clearly dictates otherwise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
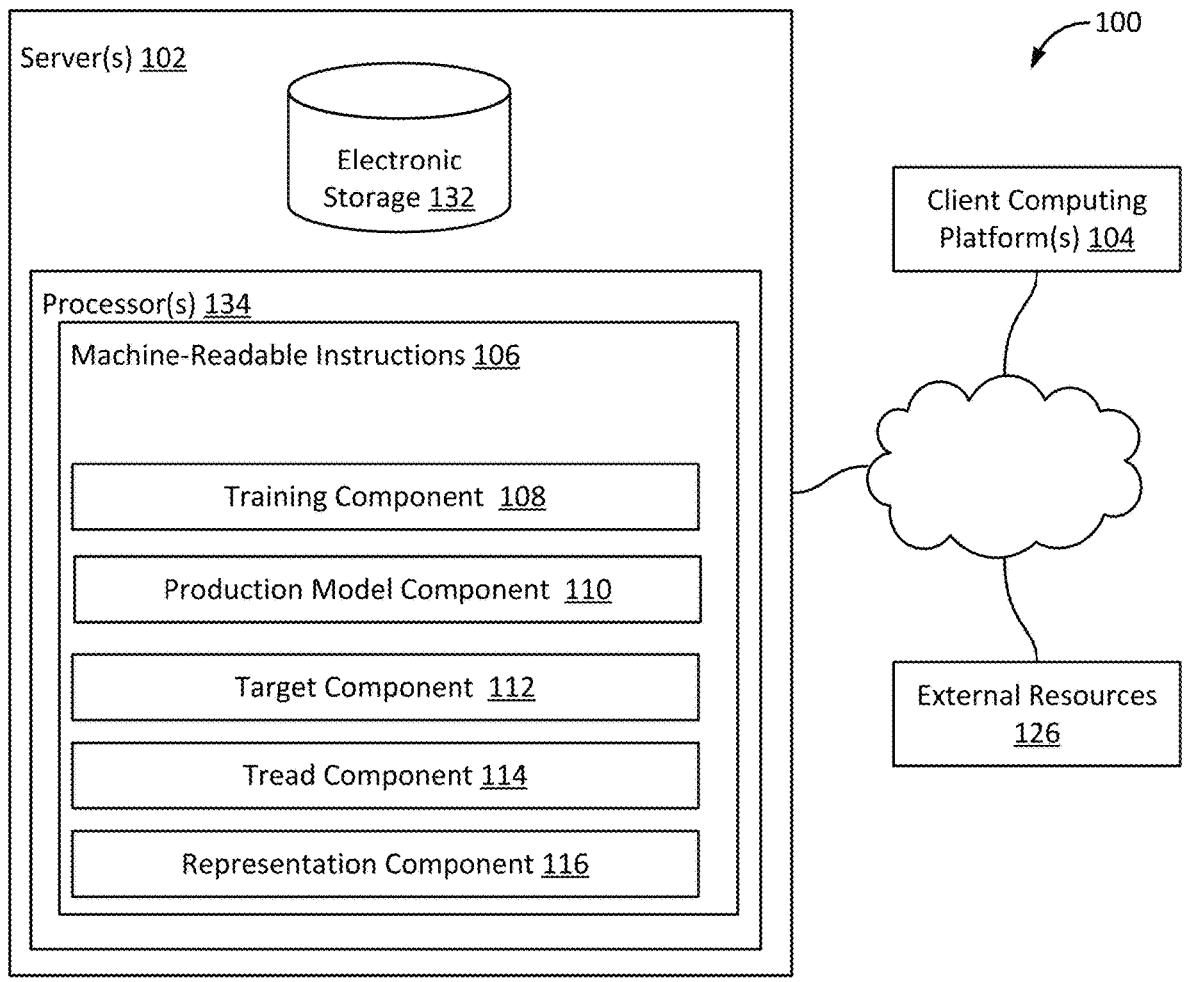
FIG. 1 illustrates an example system and dedicated components configured for predicting production and assessing prediction uncertainty, in accordance with various implementations.

TERMINOLOGY: The following terms will be used throughout the specification and will have the following meanings unless otherwise indicated.

Hydrocarbon exploration processes, hydrocarbon recovery processes, or any combination thereof may be performed on a subsurface volume of interest. The subsurface volume of interest may refer to practically anything under a surface. For example, the subsurface volume of interest may be practically anything under a terrestrial surface (e.g., practically anything under a land surface), practically anything under a seafloor, and/or other subsurface volumes. A water column may be above the subsurface volume of interest, for example, in marine hydrocarbon exploration, in marine hydrocarbon recovery, and/or other marine hydrocarbon applications. The subsurface volume of interest may be onshore in some implementations. Alternatively, the subsurface volume of interest may be offshore, with shallow water or deep water above the subsurface volume of interest, in some implementations. The subsurface volume of interest may include faults, fractures, overburdens, underburdens, salts, salt welds, rocks, sands, sediments, pore spaces, and/or other geologic features. The subsurface volume of interest may include practically any geologic point(s) or volume(s) of interest (such as a survey area).

The subsurface volume of interest may also include hydrocarbons, such as liquid hydrocarbons (also known as oil or petroleum), gas hydrocarbons (e.g., natural gas), solid hydrocarbons (e.g., asphaltenes or waxes), a combination of liquid hydrocarbons, gas hydrocarbons, and solid hydrocarbons, and/or other hydrocarbon compositions. Light crude oil, medium oil, heavy crude oil, and extra heavy oil, as defined by the American Petroleum Institute (API) gravity, are examples of hydrocarbons. Indeed, examples of hydrocarbons are many, and may include, oil, natural gas, kerogen, bitumen, clathrates (also referred to as hydrates), and/or other examples. The subsurface volume of interest may be known to include hydrocarbons in some implementations. However, the subsurface volume of interest may not be known to include hydrocarbons, such as during hydrocarbon exploration, in other implementations.

The subsurface volume of interest may also include at least one wellbore. For example, at least one wellbore may be drilled into the subsurface volume of interest in order to confirm the presence of hydrocarbons. As another example, at least one preexisting wellbore into the subsurface volume of interest or at least one new wellbore drilled into the subsurface may be used to recover the hydrocarbons. The hydrocarbons may be recovered from the entire subsurface volume of interest or from a portion of the subsurface volume of interest. For example, the subsurface volume of interest may be divided up into one or more hydrocarbon zones, and hydrocarbons may be recovered from each desired hydrocarbon zone. In some implementations, one or more of hydrocarbon zones may even be shut in to increase hydrocarbon recovery from a hydrocarbon zone that is not shut in.

The terms "comprise" (as well as forms, derivatives, or variations thereof, such as "comprising" and "comprises") and "include" (as well as forms, derivatives, or variations thereof, such as "including" and "includes") may be inclusive (i.e., open-ended) and may not exclude additional elements or steps. For example, the terms "comprises" and/or "comprising," when used in this specification, specify the presence of stated features, integers, steps, operations, elements, and/or components, but may not preclude the presence or addition of one or more other features, integers, steps, operations, elements, components, and/or groups thereof. Accordingly, these terms can be intended to not only cover the recited element(s) or step(s), but may also include other elements or steps not expressly recited. Furthermore, as used herein, the use of the terms "a" or "an" when used in conjunction with an element may mean "one," but it can also be consistent with the meaning of "one or more," "at least one," and "one or more than one." Therefore, an element preceded by "a" or "an" may not, without more constraints, preclude the existence of additional identical elements.

Unless defined otherwise, all technical and scientific terms used herein have the same meanings as commonly understood by one of skill in the art to which the disclosed technology belongs. All citations referred herein are expressly incorporated by reference.

OVERVIEW: Geostatistics can be generally described as a set of models or tools developed for statistical analysis revealing the distribution of a property or feature in space. Machine learning algorithms can be useful in situations where, due to the increasing size and complexity of spatial data, traditional methods such as visual inspection of the data or model fitting may be impractical. Machine learning can be used to learn a relationship (i.e., model) from a set of examples or training data. The learned relationship or model may be between the features and the target variable of a data set. For example, the learned relationship between geologic features (e.g., porosity, carbonate content, silica content, and/or other features) and oil production. The learned relationship can then be applied for prediction on future or unseen data. For instance, forecasted hydrocarbon production of preexisting wells and/or at new wells. While machine learning algorithms have provided unforeseen benefits in the analysis and ultimate prediction of subsurface assets of interest, existing geostatistical machine learning algorithms are not designed to take uncertainties into account. Moreover, even within the broader scope of tree-based machine learning existing approaches do not account for independent variable uncertainty while predicting a continuous dependent variable (e.g., regression). The presently disclosed technology effectively addresses this deficiency via a system that can incorporate various levels of uncertainty in the training as well as testing phases of a machine learning algorithm.

Systems and methods disclosed herein may be configured to quantify uncertainty of production forecasts accounting for uncertainty in the input variables (i.e., (geological and engineering parameters' uncertainty), and in the regression itself (i.e., standard error). Data uncertainty from measured features and designated labels may be used to build the machine learning model to improve the overall performance of the model. Property uncertainty of trend maps created from poor determination of the local trend, high spatial heterogeneity, erroneous measurements, standard error, and/or other sources of uncertainty may also be received by the machine learning model. For example, poor determination of the local trend, high spatial heterogeneity, erroneous measurements, and standard error can be sources of property uncertainty. The property uncertainty may be represented by a trend uncertainty estimate algorithm that can be based on multiple P-value statistics such as a P-value, variance, F-test ratio, and the "effective N" ($N_{eff}$). The data uncertainty may be represented by one or more probability density functions that, respectively, depict a normal distribution of a feature and the corresponding feature uncertainty. The machine learning model can be configured to receive the one or more probability density functions as input and output the learned relationship to predict hydrocarbon production and the corresponding predicted hydrocarbon production uncertainty. Using the probability density functions representing the one or more features and the corresponding one or more features uncertainty, the machine learning model may generate a prediction or quantiles representing a weighted average or quantiles of all training samples. The machine learning model may generate an uncertainty estimate of one or more target variables (i.e., dependent variables) that accounts for the propagation of uncertainty from the one or more features (i.e., independent variables). The one or more sources or input parameters used to train the machine learning model may be received by via a graphical user interface. Additionally, in response to the one or more received sources a representation using visual effects may be displayed in the graphical user interface representing the predicted hydrocarbon production and the corresponding predicted hydrocarbon production uncertainty.

In short, those of ordinary skill in the art will appreciate that improving machine learning algorithms that predict hydrocarbon production and the corresponding predicted hydrocarbon production uncertainty rely on (1) accurately determining the uncertainty or variance of geological parameters and (2) incorporating the determined uncertainty to train and test machine learning algorithms. These elements can lead to a robust machine learning algorithm that may be used for a wide variety of data sets and demonstrates improved predictions in the midst of uncertain or mischaracterized geological parameters.

CALCULATIONS/FORMULAS: The following terms will be used throughout the specification as elements of a calculation and will have the following meanings unless otherwise indicated.

P-value: A "P-value" may represent the probability that the fit of a generated model at a data point would be as good or better if all the surrounding explanatory data values are randomly shuffled while keeping the response variable in place. A P-value can be calculated from the tail area above the F-test ratio.

Total Variance: A "total variance" (or simply "variance") may represent a statistical parameter that measures the degree of variation (i.e., dispersion) of individual observations with regard to the mean. Total variance comprises two components, explained variance and residual variance, and the relationship between the two components as to total variance may be defined by $$\text{variance}_{explained} = \text{variance}_{total} - \text{variance}_{residual}$$

where residual or unexplained variance, in the context of a regression task, may represent the fraction of variance of the dependent or target variable which cannot be explained (i.e., not correctly predicted, by the explanatory variables or features). The complementary part of the total variance may be the explained variance. Explained variance can represent the proportion to which a mathematical model accounts for the variation of a given data set.

F-test Ratio: A "F-test ratio" may be defined by $$F\text{-test Ratio} = \frac{(N_{eff} - 1)(variance_{explained})}{variance_{residual}}$$

where $N_{eff}$ may represent the number of effectively independent samples from which the explained and residual variance can be calculated. $N_{eff}$ can be equivalent to the trace (i.e., sum of the diagonal terms) of the data resolution matrix that relates the observed data to the predicted data, explained variance may represent the proportion of variance to which a mathematical model accounts for the variation, and residual variance may represent the fraction of variance of the target variable which cannot be explained.

Effective N: An "effective N" ("$N_{eff}$") may be defined by $$m^{est} = G^{-g} d^{obs}$$

$$d^{pre} = G m^{est}$$

$$d^{pre} = G G^{-g} d^{obs} = N d^{obs} \text{ with } N = G G^{-g}$$

where $m^{est}$ may represent the estimated trend value solution at gridded locations or the estimated solution for any inverse operator $G^{-g}$, $d^{pre}$ may represent the predicted data for the estimated solution, $d^{obs}$ may represent the observed or sampled geological parameter data, G may represent a matrix including equations for an estimate of each gridded model location as a distance weighted sum of neighboring data, N may represent a data resolution matrix, and a trace of the data resolution may represent a $N_{eff}$ which can provide the importance, or independent information, of each observation in the solution. In the case, the predicted data is equal to the observed data, then the $N_{eff}$ would be 1 and the P-value would be 100%. That is, the estimated model solution may fit the data perfectly.

Predicted Uncertainty: A "predicted uncertainty" may be defined by $$\text{Predicted Uncertainty} = $$
$$\sqrt{(P_{value} * variance_{total} + (1 - P_{value}) * variance_{residual})}$$

where a P-value may represent the probability that the fit of a generated model at a data point would be as good or better if all the surrounding explanatory data values are randomly shuffled while keeping the response variable in place, total variance may represent a statistical parameter that measures the degree of variation of individual observations with regard to the mean, and residual variance may represent the fraction of variance of the target variable which cannot be explained.

Coarse Gridded Model: A "coarse gridded model" may be defined by $$m^{est} = [G^T G + \varepsilon^2 S]^{-1} G^T d$$

where $m^{est}$ may represent an estimated solution and $\varepsilon^2 S$ may represent a smoothness matrix that can regularize matrix $G^T G$ and stabilize its inverse. The estimated solution can represent a fitted trend through the data for a given smoothness. The smoothness coefficient can be optimized by finding the value that minimizes the matrix $[G^T G + \varepsilon^2 S]$ condition number. That is, the lower the matrix $[G^T G + \varepsilon^2 S]$ condition number the more reliable its inverse becomes.

Residual Sum of Squares (RSS): A "residual sum of squares" may be defined by $$RSS(k, T) = \sum_{i: x_i^k \leq T} (y_i - \bar{y}_l)^2 + \sum_{i: x_i^k > T} (y_i - \bar{y}_u)^2$$

where k may represent the current feature the cost function (i.e., RSS) is searching the optimal split for, T may represent the threshold value that designates the optimal split, $y_i$ may represent the production value or target variable value for ith training sample, $\bar{y}_l$ may represent the mean of target variable of all training samples with features k value less than or equal to T (i.e., left side of a split), and $\bar{y}_u$ may represent the mean of target variable of all training samples with features k value greater than T (i.e., right side of a split). Random forest regression may apply a cost function that is typically a RSS of training samples $(x_i^1, x_i^2, \ldots y_i)$ in each region. Notably, the present application may reformulate the cost function into a probabilistic residual sum of squares.

Probabilistic Residual Sum of Squares (PRSS): A "probabilistic residual sum of squares" may be defined by $$PRSS(T, k) = \sum_{i=0}^{N} \int_{-\infty}^{T} (y_i - \bar{y}_l)^2 N(x_i^k, \sigma_i^k) dx + \int_{T}^{+\infty} (y_i - \bar{y}_u)^2 N(x_i^k, \sigma_i^k) dx$$

where N may represent the number of training samples (i.e., number of existing wells with data), k may represent the current feature the cost function (i.e., PRSS) is searching the optimal split for, T may represent the threshold value that designates the optimal split, $y_i$ may represent the production value or target variable value for ith training sample, $\bar{y}_l$ may represent the mean of target variable of all training samples with features k value less than or equal to T (i.e, left side of a split), $\bar{y}_u$ may represent the mean of target variable of all training samples with features k value greater than T (i.e., right side of a split), and $N(x_i^k, \sigma_i^k)$ may represent the normal distribution describing mean and uncertainty or standard deviation of the ith sample's kth feature. Essentially, the values of k and T that can minimize the value of the cost function (i.e., PRSS) over all possible values of k and T may be determined and applied to optimally split the training samples.

Various implementations of the presently disclosed technology may incorporate the calculations or concepts described above and may be used as a reference, accordingly.

Geostatistical algorithms provide formalized methods for integrating training data of diverse type, quality, and quantity. The integration facilitated via machine learning models has provided unforeseen benefits in the analysis and ultimate prediction of subsurface assets of interest, such as the future production of oil in existing wells. Nevertheless, current machine learning algorithms assume features are measured perfectly; however, particularly in the field of earth science, many features are from models and, inherently, are approximations. For example, predicting production and accurately assessing prediction uncertainty from geological trends and engineering parameters using data analytics relies on assessing the uncertainty of trend maps created from vertical control wells and interpolated onto the production wells. Geologic property uncertainty can come from a poor determination of a local trend (i.e., large scale variation), high spatial heterogeneity (i.e., uneven distribution of various concentrations of each species within an area), erroneous measurements, and regression itself (i.e., standard error).

Conventional approaches to machine learning based hydrocarbon production forecasting fail to account for uncertainty in the input parameters. That is, most machine learning algorithms may ignore or filter a noisy feature (e.g., a feature that is poorly measured for many objects). For example, existing machine learning algorithms may ignore information in heterogeneous environments where trends are unable to be determined. The feature will be ignored in the training process, since it often does not carry relevant information. Nevertheless, for complex enough noise, the information contained in the uncertainties can be significant, when using measurement values only, even by large amounts of data and computational resources. The presently disclosed technology can employ a modified random forest algorithm to properly account for various sources of uncertainty via the application of a probabilistic versus deterministic regression. Random forest may be used for supervised or unsupervised learning. Supervised learning seeks to learn a function that, given a sample of data and desired outputs, best approximates the relationship between input and output observable in the data. Unsupervised learning, on the other hand, does not have labeled outputs, so its goal may be to infer the natural structure present within a set of data points. In both regression and classification, the goal is to find specific relationships or structure in the input data that provide a basis to effectively produce correct output data. Notably, correct output may be determined entirely from the training data and noisy or incorrect data may reduce the effectiveness of model. Thus, assessing the uncertainty, or noisiness, of the input data for the random forest enhances the effectiveness of the final model and corresponding predictions or output data. The presently disclosed technology may provide a more comprehensive depiction of an asset's predicted value as well as the uncertainty in the asset's predicted value through the incorporation of input parameters that accurately represent the confluence of several sources of uncertainty inherent to earth science Disclosed below are methods, systems, and computer readable storage media comprising machine learning algorithms that can estimate feature uncertainty from training data, and a quantile probabilistic random forest regression forests that may use an objective function that incorporates feature uncertainty in the generated tree structure. The trained machine learning algorithm may then be applied to a target set of geological parameters and corresponding target geological parameter uncertainty values to generate a set of production prediction values and corresponding production uncertainty values.

Further implementations disclosed below are methods, systems, and computer readable storage media that provide an estimation of well productivity and the uncertainty of the estimation as a function of probability distributions (i.e., input data) representing the trend and variance of geologic properties in a subsurface volume of interest.

Reference will now be made in detail to various implementations, examples of which are illustrated in the accompanying drawings. In the following detailed description, numerous details may be set forth in order to provide a thorough understanding of the present disclosure and the implementations described herein. However, implementations described herein may be practiced without such details. In other instances, some methods, procedures, components, and mechanical apparatuses may not be described in detail, so as not to unnecessarily obscure aspects of the implementations.

FIG. 1 illustrates an example system 100 and dedicated components configured for predicting production and assessing prediction uncertainty, in accordance with various implementations. In implementations, system 100 may provide one or more hydrocarbon predictions for a subsurface volume of interest. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a training component 108, a production model component 110, a target component 112, a tread component 114, and a representation component 116, and/or other instruction components.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

Training component 108 may be configured to obtain, from the non-transient electronic storage, training data, the training data including production data, engineering parameters, geological parameters, and geological parameter uncertainty values corresponding to a subsurface volume of interest. The production data may be derived from preexisting wells corresponding to the subsurface volume of interest. The production data may include historical oil, gas, and/or water production at different time intervals. The production data may also include cumulative oil, gas, and/or water production at different time intervals, such as, for example, 6 month or 18 month cumulative standard barrels of oil equivalent produced. cumulative oil production, historical oil production, cumulative gas production, historical gas production, and cumulative oil production at a plurality of different time intervals The engineering parameters may include cutting and pressure properties, drilling properties, well length, injected proppant, wellbore configurations and properties, fluid types, well spacing, and/or other engineering parameters. The engineering parameters can be, in general, controlled by the drilling and completions engineer.

The geological parameters may include trends of petrophysical properties (e.g., lithology, water saturation, permeability, porosity, density, and/or other properties), trends of core and formation properties, seismic properties, and/or other geological data. In some implementations, trends of well data may be interpolated using geostatistical tools such as kriging, inverse distance weighting (IDW), autocorrelation gridding techniques, bicubic interpolating functions, and/or other techniques to generate a set of geological parameters.

The geological parameter uncertainty value may include a predicted uncertainty or statistical uncertainty of the one or more geological parameters described immediately above. The geological parameter uncertainty value can describe property uncertainty that arises from one or more sources. For example, poor determination of the local trend, high spatial heterogeneity, erroneous measurements, and regression itself (i.e., standard error) can be sources of property uncertainty. Production and engineering data can be measured directly at the producing wells and have significantly less uncertainty then the trend data which must be inferred from other non-producing wells.

Production model component 110 may be configured to obtain an initial production model and a trained production model. The initial production model may be obtained from the non-transient electronic storage and/or other sources. The initial production model may include a deterministic random forest, probabilistic random forest, and/or another machine learning technique. The production model component 110 may be configured to generate a trained production model by training the obtained initial production model using the training data. The training data may include production data, engineering parameters, geological parameters, and geological parameter uncertainty values corresponding to a subsurface volume of interest. The training data may also include data at wells as response variables such as geological (e.g., net-to-gross, porosity, silica content) and engineering parameters (e.g., well length, injected proppant). Trends and response variable uncertainty may be parametrized through P-value, residual and total variance, F-test ratio, $N_{eff}$ can be jointly estimated from training data both existing and new wells. The trained production model may include a deterministic random forest, probabilistic random forest, and/or another machine learning technique. The trained production model may be able to predict hydrocarbon production and the corresponding predicted hydrocarbon production uncertainty by recognizing patterns in the training data.

Target component 112 may be configured to obtain, from the non-transient electronic storage, target data corresponding to a subsurface volume of interest. The target data may include target engineering parameters, target geological parameters, and target geological parameter uncertainty values.

The target data may include production data at preexisting wells, geological parameters at new wells, engineering parameters at new wells, and geological parameter uncertainty values at new wells. Preexisting wells may be described as wells in which historical and/or cumulative production data exists. On the other hand, new wells may be described as wells in which no historical production data exists, wells for potential new locations, and/or wells to be drilled. The preexisting and new wells or new locations comprises wells within a subsurface volume of interest. The subsurface volume of interest may be represented as within a formation for a given basin.

Tread Component 114 may be configured to obtain, from the non-transient electronic storage, a tread estimation algorithm and a tread estimation uncertainty algorithm. The tread component 114 can be used to assess trend and variance of poorly characterized or indeterminate geologic parameters. The tread estimation algorithm may include an expected tread value of the geological parameters and the tread estimation uncertainty algorithm may include a statistical uncertainty of geological parameters. For example, the expected tread value and statistical uncertainty of porosity, silica content, and carbonate content that can be interpolated from measured geologic parameter data to the collated spatial location of the production data.

The tread estimation algorithm can be based on a generalized least-square inversion using the equation $d^{obs}=Gm^{est}$ where $d^{obs}$ may represent the measured geologic parameter data, G may represent a matrix containing the equations for the estimate of each gridded model location as a distance weighted sum of nearby data, and $m^{est}$ may represent the estimated inversion model (i.e., the trend values at gridded locations). The tread estimation uncertainty algorithm can be based on statistical measures of P-value, residual and total variance, F-test ration, and $N_{eff}$ that can be determined during the generalized least-square inversion.

Representation component 116 may be configured to display, from the non-transient electronic storage, a set of production values and corresponding uncertainty values as a function of position with the subsurface volume of interest. The display may include a generated representation using visual effects that can depict at least a portion of the set of production values and corresponding uncertainty values. The generated representation may be displayed by a graphical user interface and can represent the predicted hydrocarbon production and the corresponding predicted hydrocarbon production uncertainty.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may include non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, and/or other ports) or a drive (e.g., a disk drive and/or other drives). Electronic storage 128 may include one or more of optically readable storage media (e.g., optical disks), magnetically readable storage media (e.g., magnetic tape, magnetic hard drive, floppy drive), electrical charge-based storage media (e.g., EEPROM, RAM), solid-state storage media (e.g., flash drive), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a physical computer processor, a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or 116, and/or other components. Processor(s) 130 may be configured to execute components 108, 110, 112, 114, and/or 116, and/or other components by software; hardware; firmware; some combination of software, hardware, and/or firmware; and/or other mechanisms for configuring processing capabilities on processor(s) 130. Processor(s) 130 may be configured to present information on a graphical user interface. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 130 includes multiple processing units, one or more of components 108, 110, 112, 114, and/or 116 may be implemented remotely from the other components. The description of the functionality provided by the different components 108, 110, 112, 114, and/or 116 described herein is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As an example, processor(s) 130 may be configured to execute one or more additional components that may perform some or all of the functionality attributed herein to one of components 108, 110, 112, 114, and/or 116.

Figure 2:
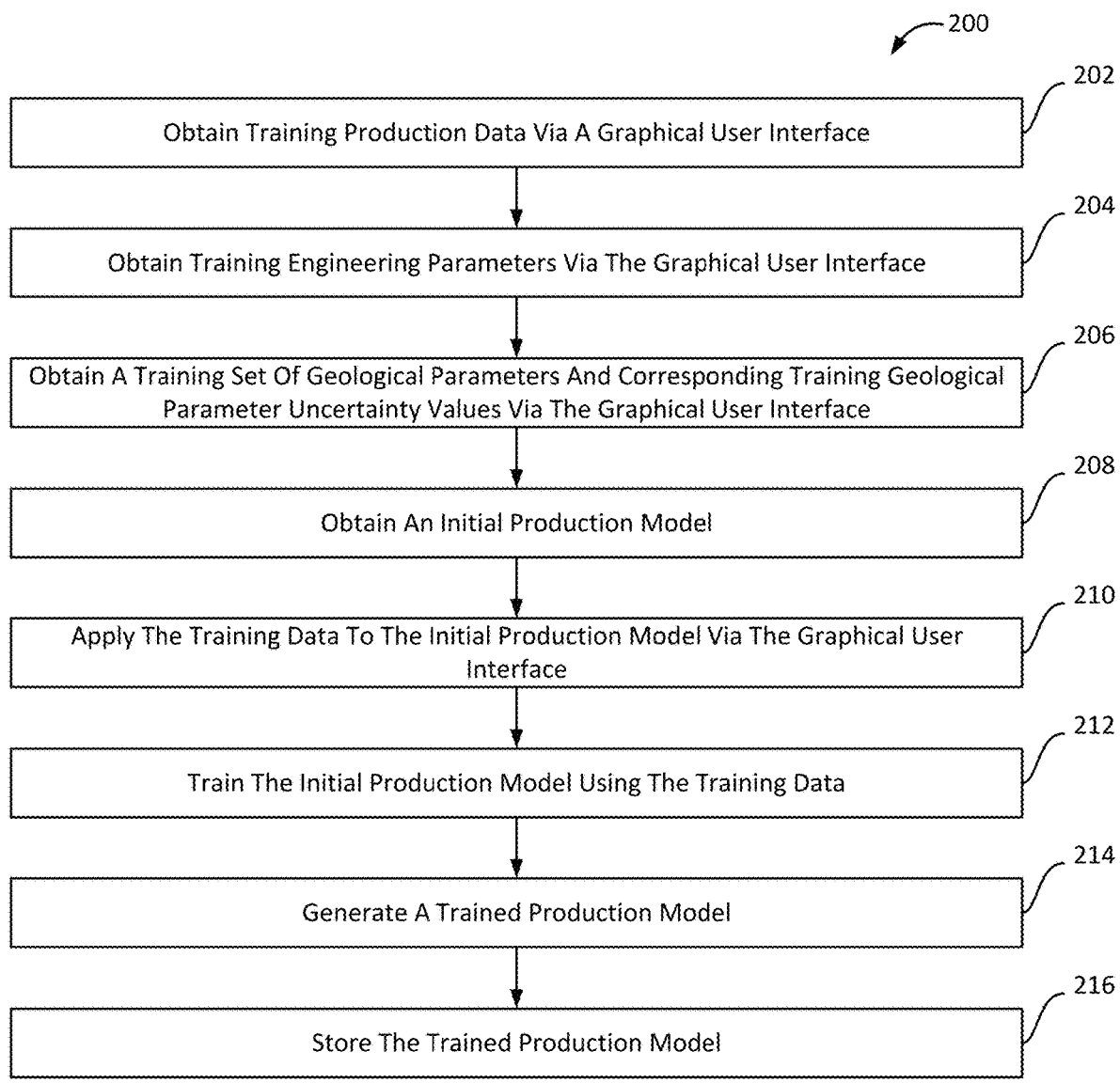
FIG. 2 illustrates a sample method for training a production model, in accordance with various implementations.

FIG. 2 illustrates a sample method for training a production model, in accordance with various implementations. Referring to FIG. 2, a method 200 describes a sample process for training the initial production model. An operation 202 may include obtaining training production data. The training production data may be obtained via a graphical user interface and derived from preexisting wells corresponding to the subsurface volume of interest. The training production data can include cumulative oil, gas, water production, and/or other production data. Operation 204 may include obtaining training engineering parameters. The training engineering parameters may be obtained via the graphical user interface and derived from preexisting wells corresponding to the subsurface volume of interest. The training engineering parameters can include cutting and pressure properties, drilling properties, well length, injected proppant, wellbore configurations and properties, fluid types, well spacing, and/or other engineering parameters. Operation 206 may include obtaining a training set of geological parameters and corresponding training geological parameter uncertainty values via the graphical user interface and derived from preexisting wells corresponding to the subsurface volume of interest. The training set of geological parameters and corresponding training geological parameter uncertainty values can include petrophysical properties, core and formation properties, seismic properties, and/or other geological data. The training set of geological parameters may also include the expected tread value and statistical uncertainty of the parameters just described.

An operation 208 may include obtaining an initial production model from electronic storage via the graphical user interface. The initial production model may include a deterministic random forest, probabilistic random forest, and/or another machine learning technique. An operation 210 may include applying the training data to the initial production model via the graphical user interface. In one implementation, probability density functions representing the training data may be applied as the input parameters for the initial production model.

Operation 212 may include training the initial production model based on the training data. The training data can include the information obtained in operations 202-206 and/or other training data. The training can also include finding the threshold values and feature parameters that can separate the input parameters into regions with similar input parameters. The threshold values can be determined via a probabilistic residual sum of squares.

An operation 214 may include generating a trained production model. The trained production model may include the production model created after inputting the training data and revealing relationships between input parameters and target variable. That is, high value parameters will be given more weight and low value parameters will be given less weight. Operation 216 may include storing the trained production model in electronic storage for later retrieval and prediction applications.

Figure 3:
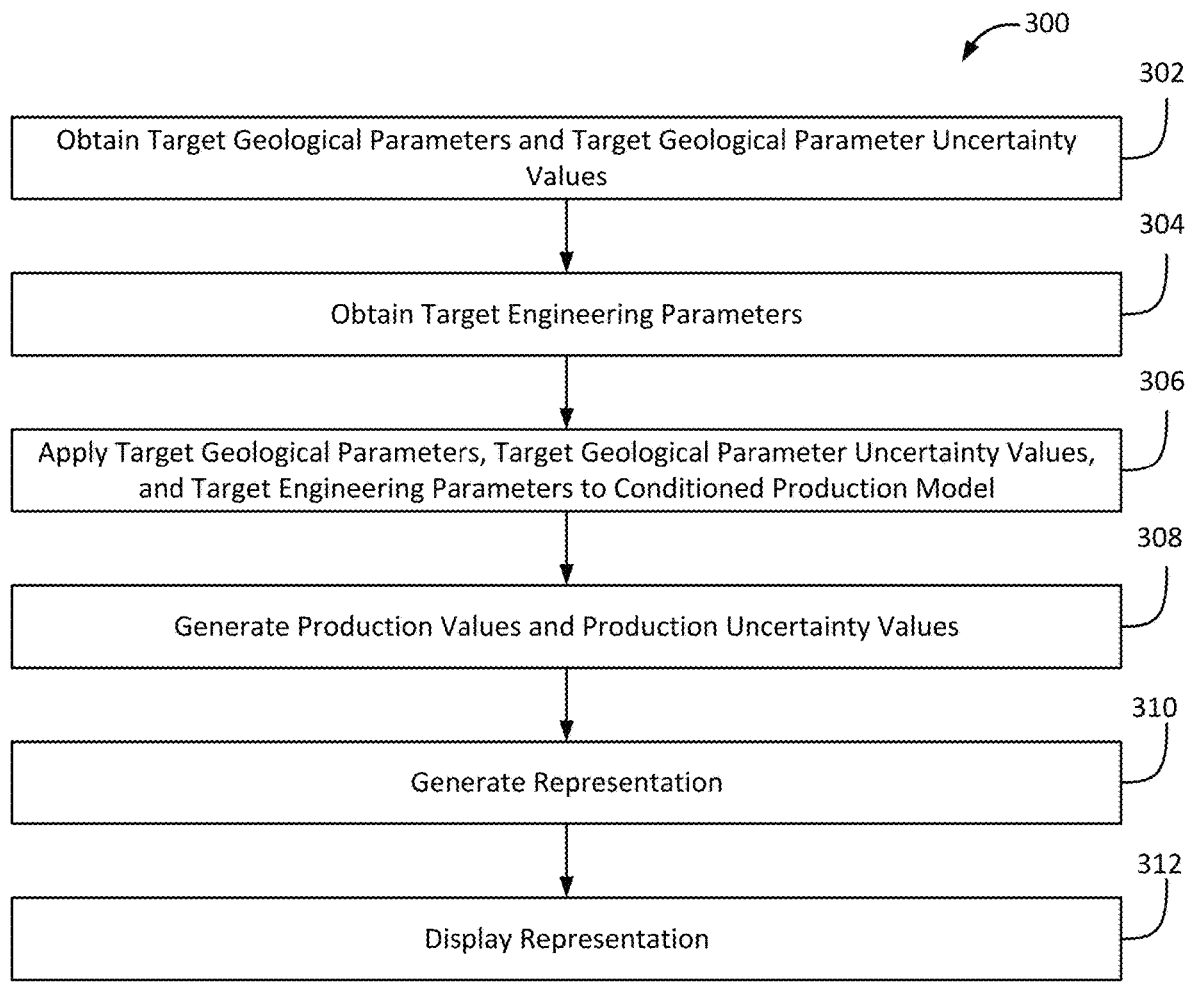
FIG. 3 illustrates a sample method for applying a trained production model, in accordance with various implementations.

FIG. 3 illustrates a sample method for using a trained production model for predictive purposes, in accordance with various implementations. Referring to FIG. 3, the sample testing method 300 describes the process of performing a prediction and prediction uncertainty based on a trained production model. Operation 302 may include obtaining a target set of geological parameters and corresponding target geological parameter uncertainty values via a graphical user interface and derived from new wells corresponding to a subsurface volume of interest. Notably, the subsurface volume of interest has changed from a preexisting well location to a new location that can contain unknown geologic properties. The target set of geological parameters and corresponding target geological parameter uncertainty values can include petrophysical properties, core and formation properties, seismic properties, and/or other geological data. The target set of geological parameters may also include the expected tread value and statistical uncertainty of the parameters just described. Operation 304 may include obtaining target engineering parameters. The target engineering parameters may be obtained via the graphical user interface and derived from preexisting wells corresponding to the subsurface volume of interest. The target engineering parameters can include cutting and pressure properties, drilling properties, well length, injected proppant, wellbore configurations and properties, fluid types, well spacing, and/or other engineering parameters.

Operation 306 obtains the trained production model and applies the target set of geological parameters, the target geological parameter uncertainty values, and the target engineering parameters to the obtained trained production model which can be a machine learning algorithm. In one implementation, the machine learning algorithm may be a random forest regression that may be modified to accept probability distributions as input parameters. The modification alters the random tree regression from a deterministic model to a probabilistic model. The input parameters can be described by a normal distribution in which various levels of uncertainty are associated with each input parameter. Various levels of uncertainty corresponding to each individual feature can be applied by the graphical user interface to the trained production model. An operation 308 generates a prediction of production as well as uncertainty associated with the prediction. Operation 310 generates a representation of the prediction of production and the uncertainty associated with the prediction. Operation 312 displays the representation for viewing via the graphical user interface.

Figure 4:
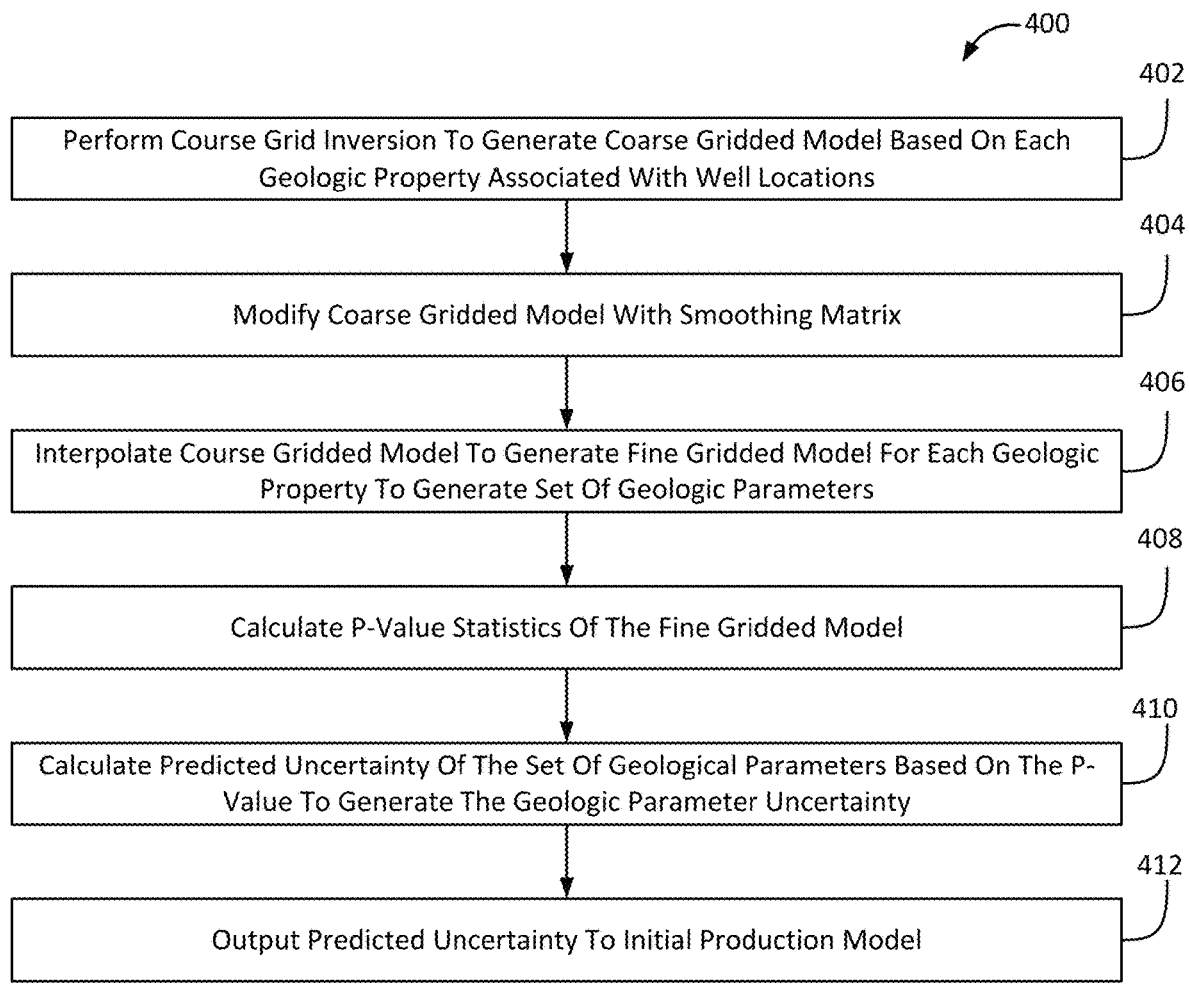
FIG. 4 illustrates an example method for performing geostatistical interpolation, in accordance with various implementations.

FIG. 4 illustrates an example method for performing geostatistical interpolation, in accordance with various implementations. Referring to FIG. 4, the example method 400 may be directed at determining a set of geological parameters and the corresponding geological parameter uncertainty. Operation 402 performs a coarse grid inversion that can generate a coarse gridded model. The coarse gridded model may be estimated by a generalized least-square inversion using the equation $d^{obs} = Gm^{est}$ and previously discussed above. The sampled data may include sampled geologic properties at preexisting well locations. Operation 404 may modify the model solution by adding model smoothness constraints to account for coarse grid nodes that may not be near input data locations (i.e., observed data). The smoothness constraints or smoothness matrix may regularize matrix $G^T G$ and can stabilize its inverse (See coarse gridded model equation above). Operation 406 interpolates the coarse gridded model to generate a fine gridded model for each geologic property to generate the set of geological parameters. The interpolation may include a bicubic interpolation and/or other interpolation techniques. In order to determine the geological parameter uncertainty value, Operation 408 may determine the P-value statistics. The P-value statistics can include the P-value, F-test ratio, variance, and $N_{eff}$. The P-value can be calculated from the tail area above the F-test ratio. The F-test ratio, $N_{eff}$ and variance components may also be determined according their respective calculations defined above. Operation 410 may calculate a predicted uncertainty of the set of geological parameters based on the P-value statistics to generate the geological parameter uncertainty value. The calculation may also be determined by the calculations defined above. Operation 412 may output the calculated predicted uncertainty value to the initial production model in order to quantify the uncertainty represented by the input parameters (i.e., geological parameters) for the production model.

Figure 5:
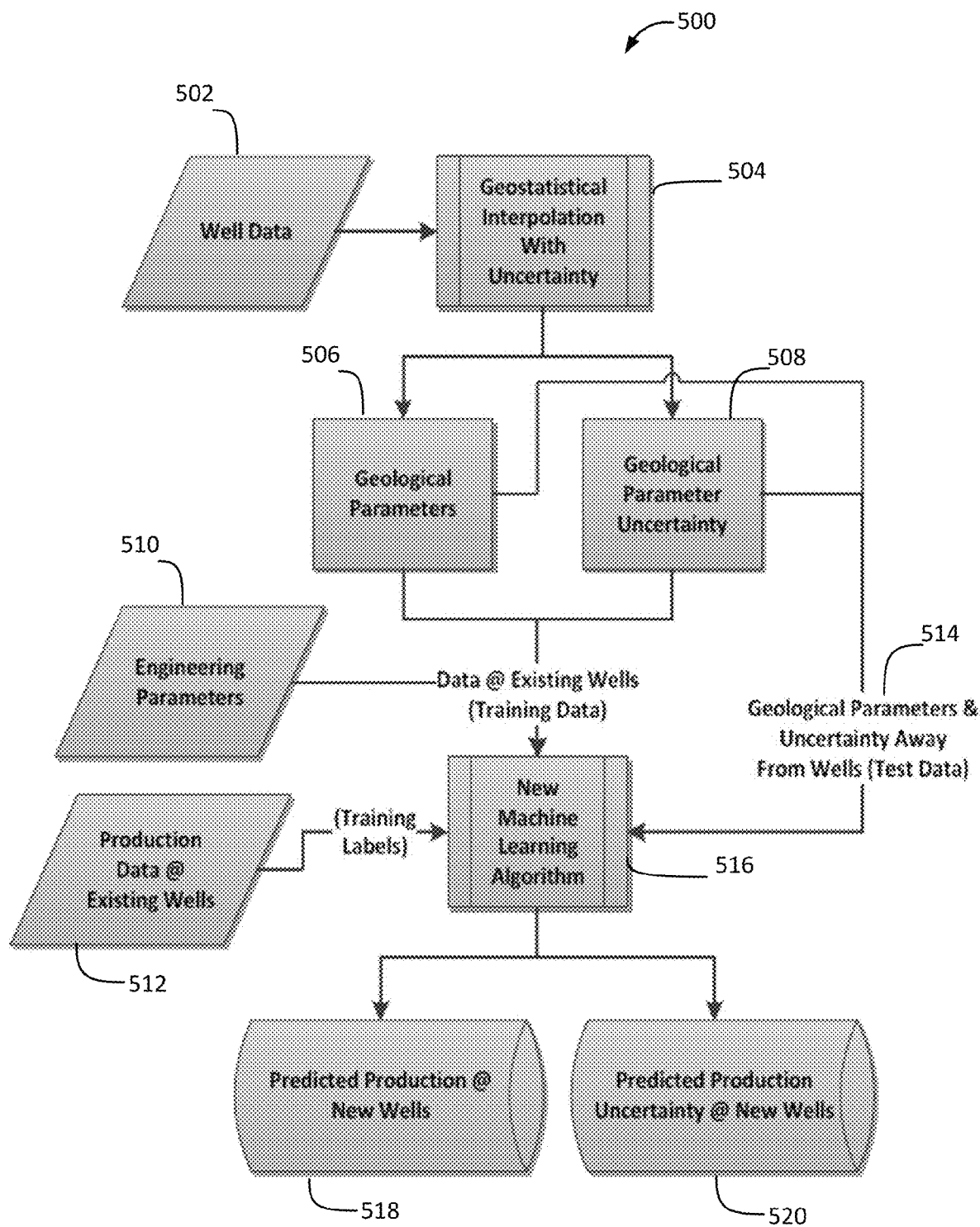
FIG. 5 illustrates a flowchart of an example production prediction and production prediction uncertainty, in accordance with various implementations.

FIG. 5 illustrates a flowchart, in accordance with various implementations. Referring to FIG. 5, a flowchart 505 directed to the presently disclosed technology and the various operations that can be performed to predict production and predicted production uncertain at new wells. Well data 502 may include production data derived from preexisting wells corresponding to the subsurface volume of interest. The well data may include cumulative oil, gas, and/or water production at different time intervals, such as, for example, 6 month or 18 month cumulative standard barrels of oil equivalent produced. Geostatistical interpolation with uncertainty 504 may include various interpolation such as kriging, inverse distance weighting (IDW), autocorrelation gridding techniques, bicubic interpolating functions, and/or other techniques to generate a set of geological parameters 506 as well as corresponding geological parameter uncertainty 508. Engineering parameters 510 may include cutting and pressure properties, drilling properties, well length, injected proppant, wellbore configurations and properties, fluid types, well spacing, and/or other engineering parameters. Production data at existing wells 512 may include production data derived from preexisting wells corresponding to the subsurface volume of interest. The production data may include cumulative oil, gas, and/or water production at different time intervals, such as, for example, 6 month or 18 month cumulative standard barrels of oil equivalent produced. The production data at existing wells can represent the target variable well data. Geological parameters and uncertainty away from wells 514 may represent the test data that can be used to make a final prediction of hydrocarbon production and hydrocarbon production uncertainty. Machine learning algorithm 516 may include machine learning techniques that can account for and propagate input parameter uncertainty. The machine learning algorithm can use input parameters from existing wells such as geological parameters 506, geological parameter uncertainty 508, engineering parameters 510, and production data 512 to derive a relationship between the target variable (i.e., production) and input parameters. The derived relationship may be applied to the geological parameters and uncertainty away from wells 514 to generate a predicted production at new wells 518 and a predicted production uncertainty at new wells 520. Several features in FIG. 5 can be highlighted to emphasize the differences between known forms of machine learning regression, specifically random forest regression. Briefly, (i) geostatistical interpolation with uncertainty that provides geological parameters and a measure of geological parameter uncertainty at current and future wells, (ii) a machine learning algorithm that can be configured to input geological parameters and associated uncertainties which are represented by probability density functions of a normal distribution, and (iii) the machine learning algorithm that can be configured to output predicted production at new wells and predicted production uncertainty at new wells.

Figure 6:
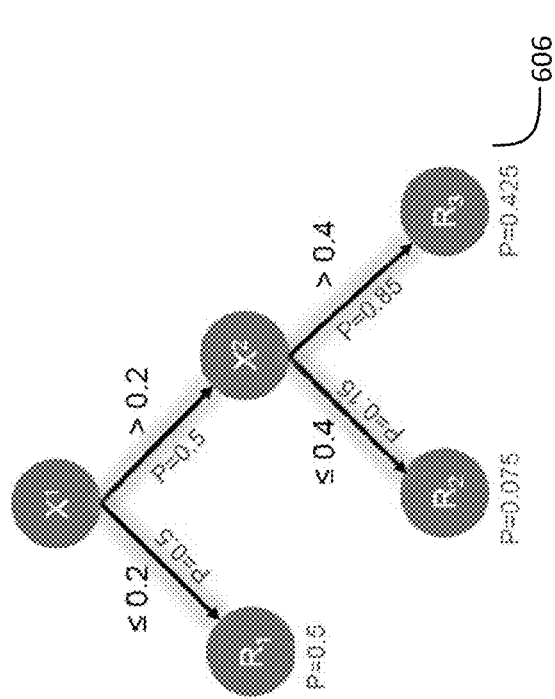
FIG. 6 illustrates an example comparison between deterministic and probabilistic random forest regression, in accordance with various implementations.
Figure 6:
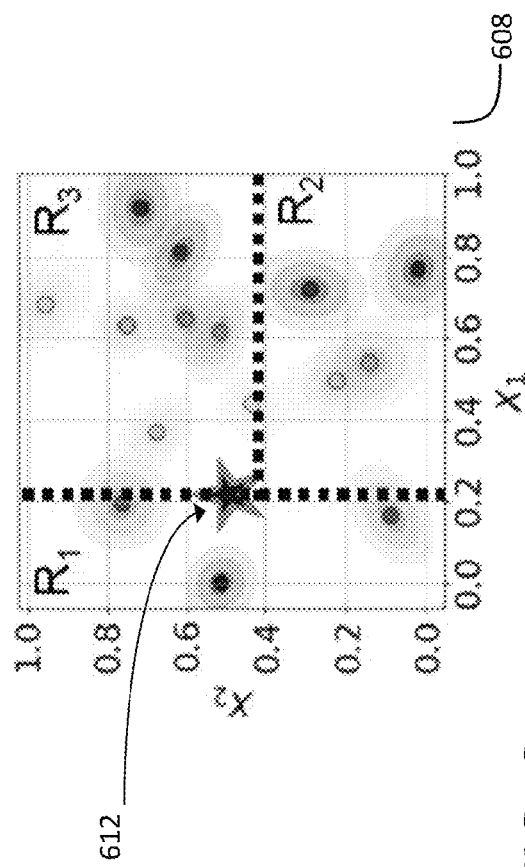
Figure 6:
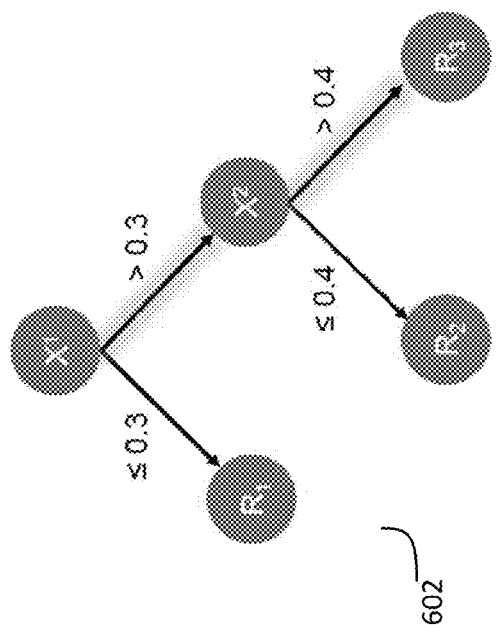
Figure 6:
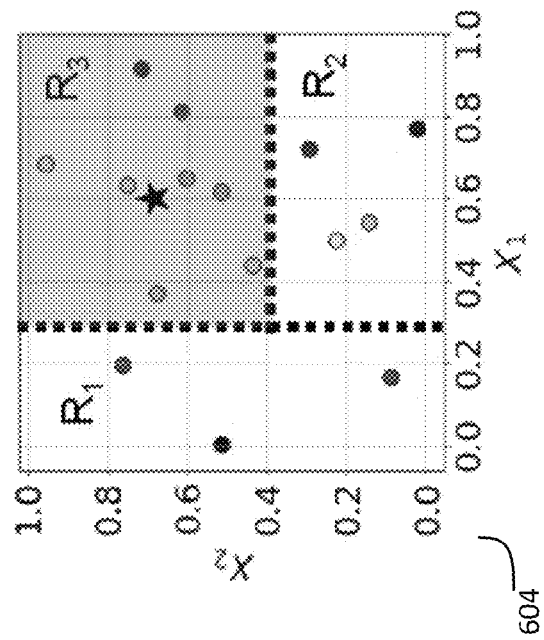

FIG. 6 illustrates an example comparison between a deterministic and probabilistic random forest regression, in accordance with various implementations. Referring to FIG. 6, the testing phases of a deterministic random forest regression and a probabilistic random forest regression may be represented by 602/604 and 606/608, respectively. A deterministic random forest regression may represent a single realization of geologic features while a probabilistic random forest regression may represent a set of realizations obtained from the probability distributions of the input parameters. Essentially, feature space can be partitioned into regions (e.g., R1, R2, and R3) using thresholds that can be designed to group training samples having similar target values. In a probabilistic model, the training samples may belong to multiple feature regions with varying probabilities. For example, as seen in feature space graph 608, the example training sample represented by the large star 612 can demonstrate a decision tree's final prediction of 50% in the R1 region, 42.5% in the R3 region, and 7.5% in the R2 region. Notably, as shown by probabilistic decision tree 606, the probability can be propagated to all terminal nodes. This process may be numerously repeated, and the final prediction may be the weighted mean of all training samples and the quantiles may be the weighted quantiles of all training samples.

The pertinent differences between deterministic and probabilistic random forest regression can be the (i) feature uncertainty represented by respective normal distributions 608, (ii) traversing to all terminal nodes 606, (iii) a designated cost function (See PRSS equation above), and (iv) prediction and quantiles are calculated based on the respective weight all training samples 606 and 612.

Figure 7:
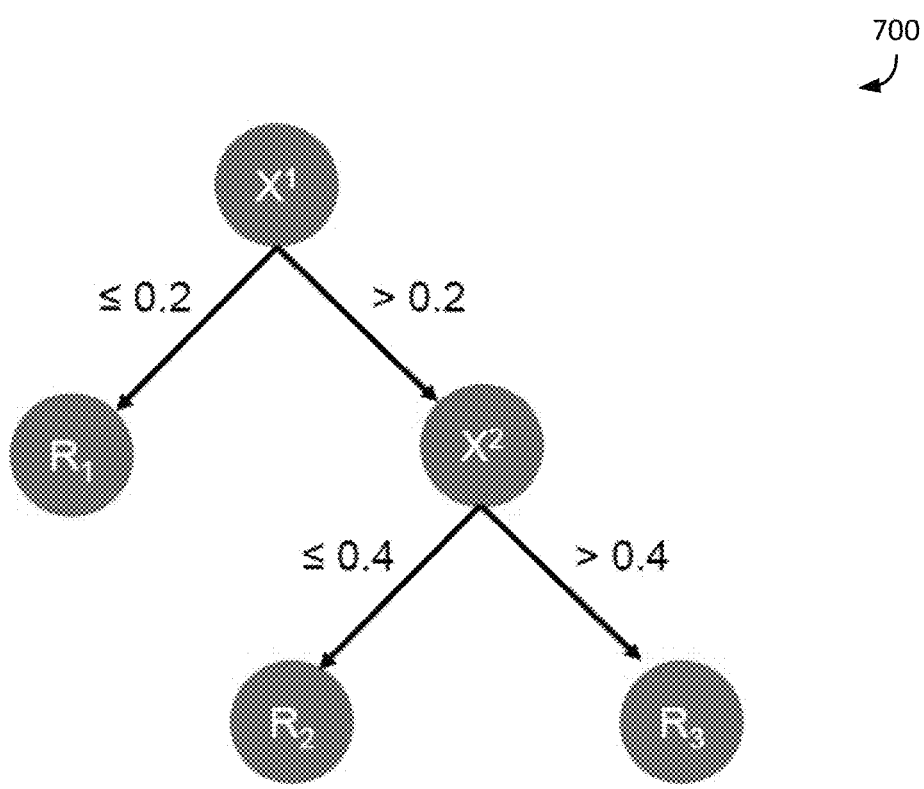
FIG. 7 illustrates an example training phase of a production model based on probabilistic random forest regression, in accordance with various implementations.
Figure 7:
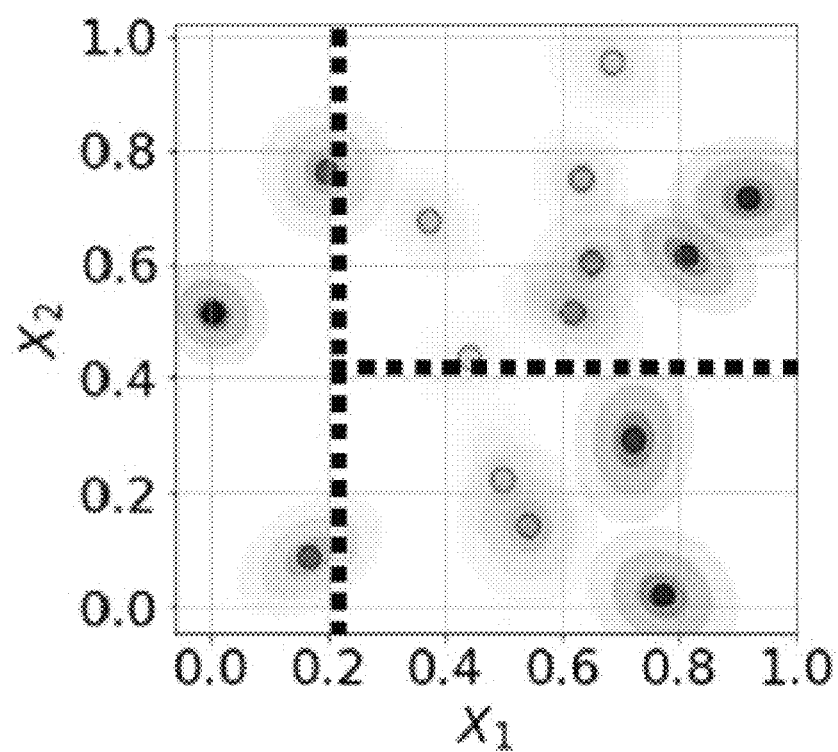
Figure 8:
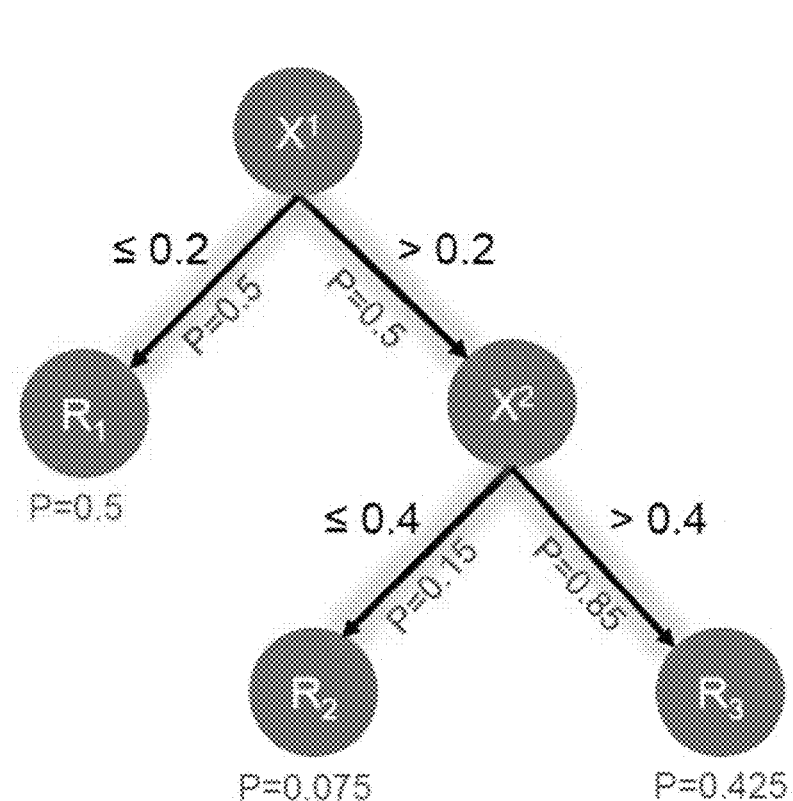
FIG. 8 illustrates an example testing phase of a production model based on probabilistic random forest regression, in accordance with various implementations.
Figure 8:
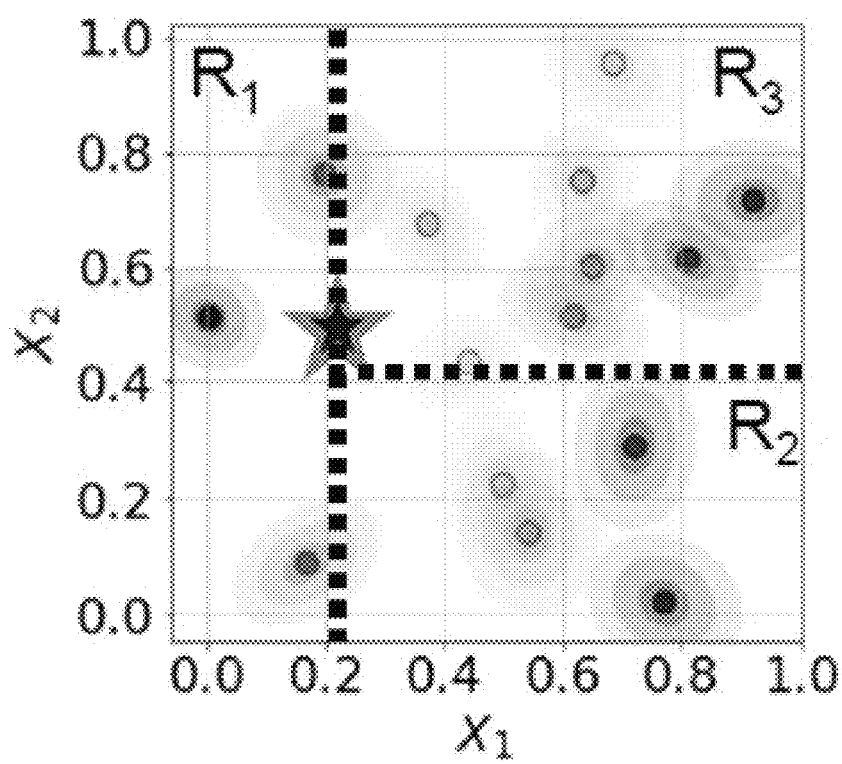

FIG. 7 illustrates an example training phase of a production model based on probabilistic random forest regression, in accordance with various implementations. Specifically, FIG. 7 depicts two nodes of a single decision tree 700 and the corresponding output of a random forest algorithm 702. For brevity, two features are illustrated; however, more features may be used in accordance with the data set and desired computational load. Essentially, the principle may be to partition the feature space into regions using rules (e.g., $X^2<0.25$) such that training samples in each region have similar target values. Feature space may refer to a n-dimensional space (i.e., n is number of features) which represents where the training samples reside. The 2D plots shown in FIGS. 6-8 illustrates examples where the feature space is the 2D plane of x1 vs x2. The feature space may be partitioned by iteratively finding the optimal threshold, according to a cost function, for each feature. In this example implementation, the cost function may be a probabilistic residual sum of squares (PRSS) of training samples in each region (See PRSS equation above). The cost function may be repeated over all features or variable and until a maximum depth may be reached or not enough training samples are left in the terminal node.

FIG. 8 illustrates an example testing phase of a production model based on probabilistic random forest regression, in accordance with various implementations. Specifically, FIG. 8, depicts two nodes of a single decision tree 800 and the corresponding output of a random forest algorithm 802. The testing phase or prediction phase may include traversing the decision tree until all terminal nodes are reached. Additionally, at each tree split or node, probability may be tracked and propagated until all terminal nodes are reached. This process may be numerously repeated, and the final prediction may be the weighted mean of all training samples and the quantiles are weighted quantiles of all training samples. In this example, along the axis x1=0.2 two training samples belong to both R1 and R2 as well as R1 and R3, respectively.

Figure 9:
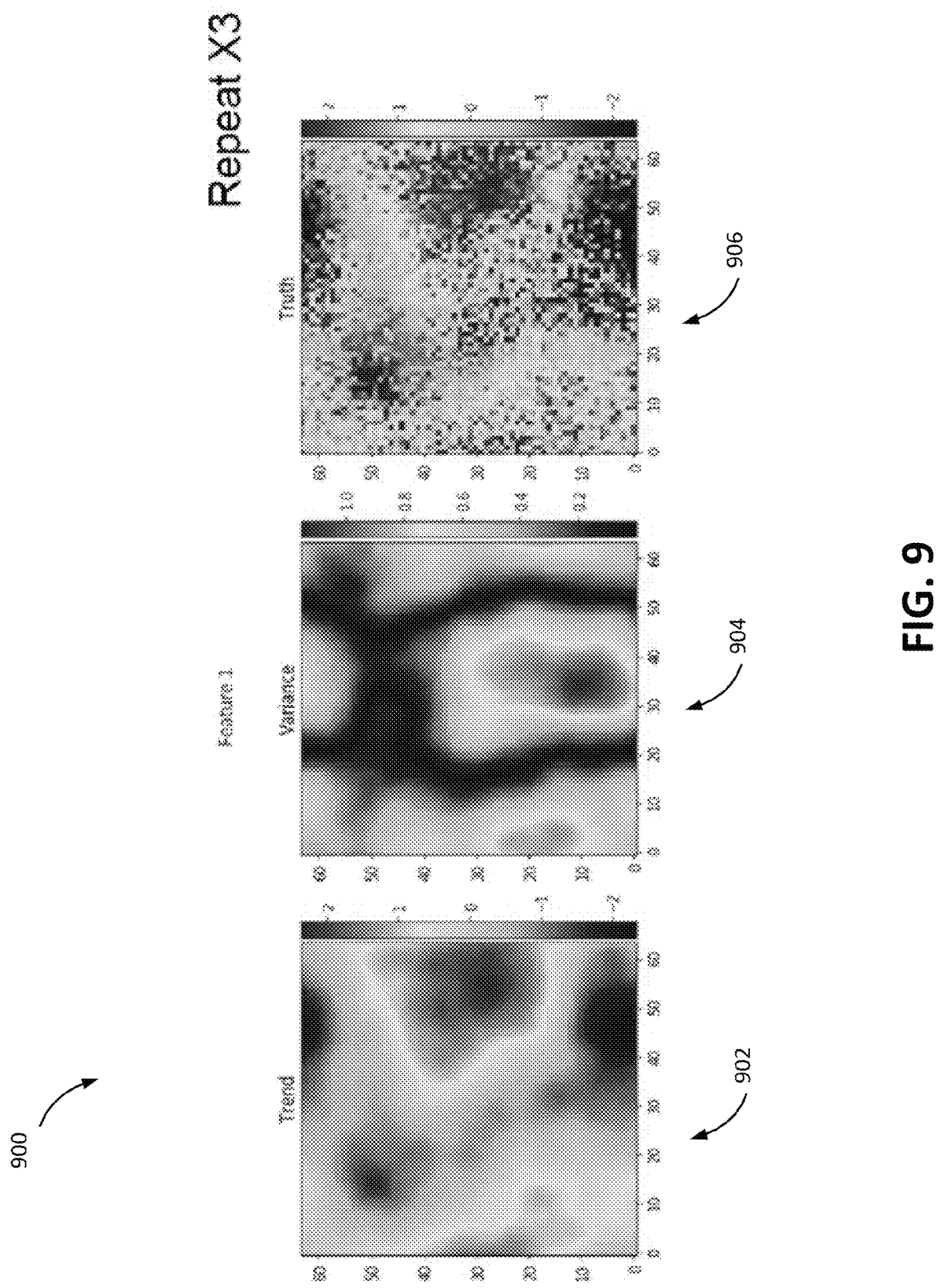
FIG. 9 illustrates an example process for creating a synthetic geological parameter based on the combination of variance and trend, in accordance with various implementations
Figure 11:
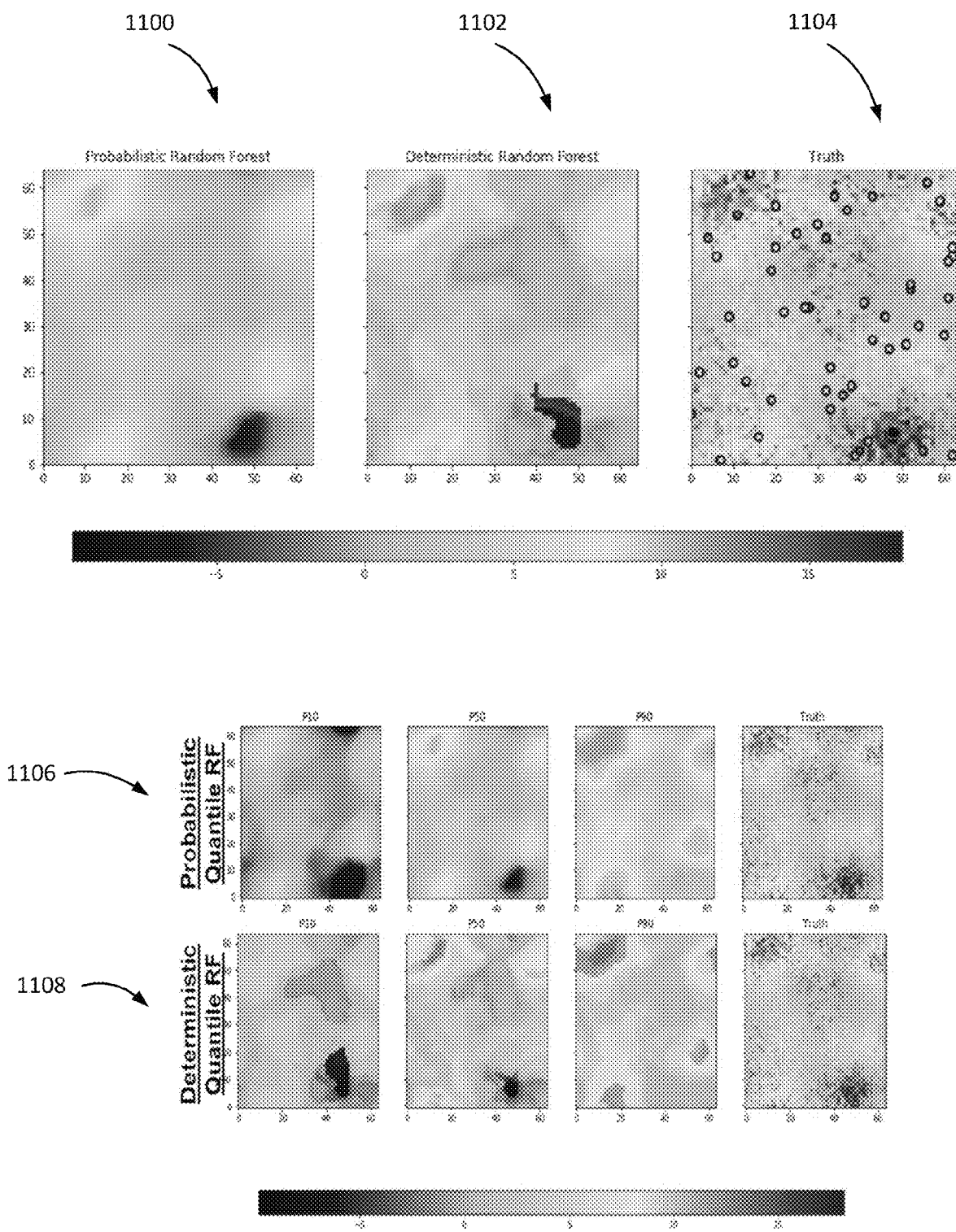
FIG. 11 illustrates example comparisons between deterministic and probabilistic random forest regression, in accordance with various implementations.

FIG. 9 illustrates an example process for creating a synthetic geological parameter based on the combination of variance and trend, in accordance with various implementations. Referring to FIG. 11, a synthetic geological parameter 900 may be created by generating two random fields: trend and variance. Trend 902 and variance 904 can then be combined using N ($\mu$=Trend, $\sigma^2$=Variance) and sampled to generate "truth" 906 of an arbitrary geologic feature. Truth can represent a true geological parameter that cannot be perfectly observed. The process can be repeated three times to generate three geological parameters.

Figure 10:
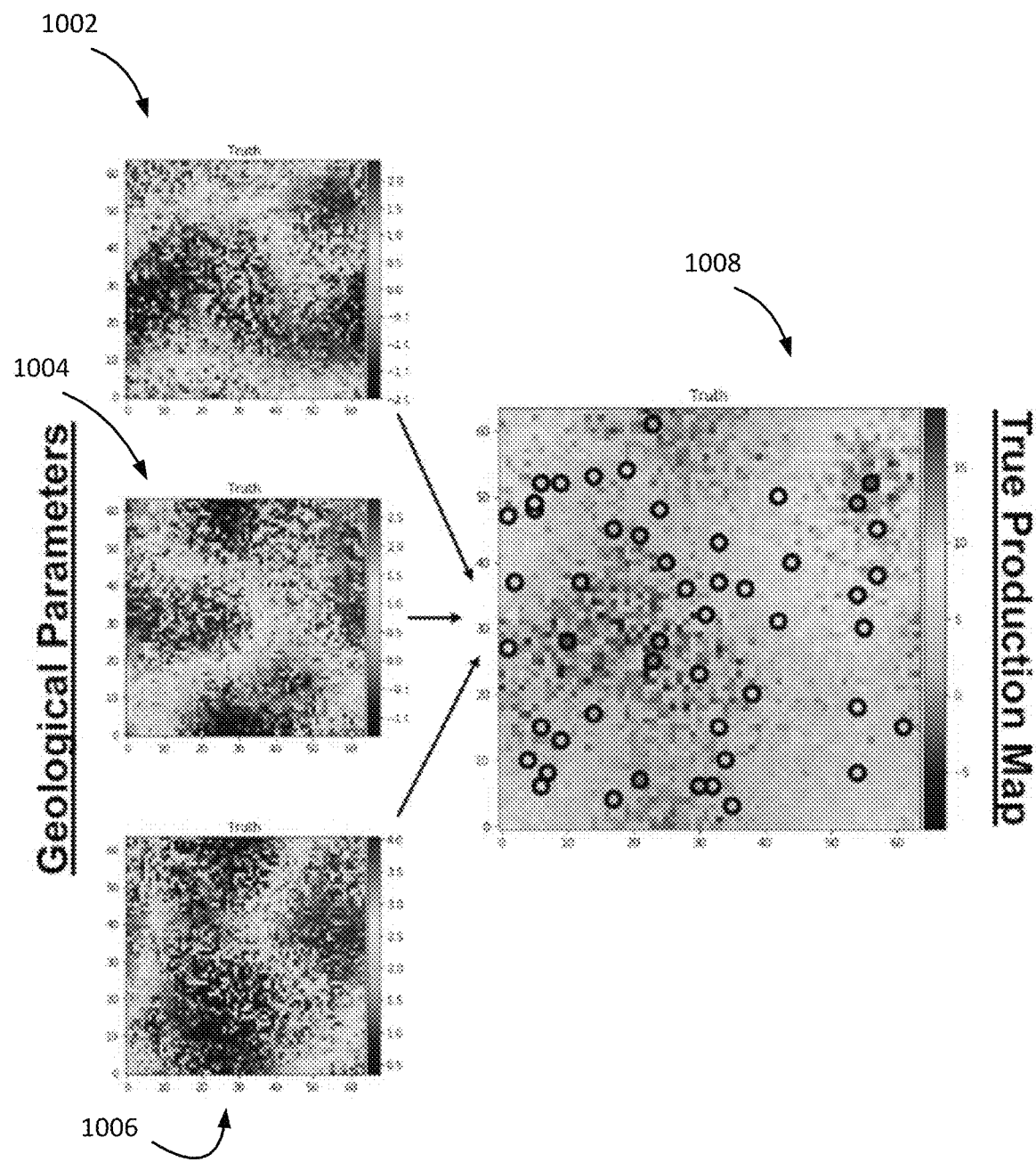
FIG. 10 illustrates an example synthetic production map based on the synthetic parameters created in the process described in FIG. 11, in accordance with various implementations

FIG. 10 illustrates an example synthetic production map based on the synthetic parameters created in the process described in FIG. 9, in accordance with various implementations. Referring to FIG. 10, a synthetic production map 1008 can be created by combining the geological parameters ($\{G_1, G_2, G_3\}$) 1002, 1004, 1006 created in FIG. 9. Specifically, the following formula can be applied $P=G_1+G_2+4*G_3$ to arrive at the synthetic production map. Data from the synthetic production map may be used to train and test the random forest machine learning algorithm.

FIG. 11 illustrates example comparisons between deterministic and probabilistic random forest regression, in accordance with various implementations. The FIG. 11 demonstrates the improved estimation of uncertainty using probabilistic random forest regression. Geostatistical simulations 1100, 1102, and 1104 can compare the percentage of variance explained in probabilistic vs deterministic random forest regression. In this synthetic example, the geostatistical simulation 1100 depicting probabilistic random forest explains a higher percentage of variance relative to a geostatistical simulation truth 1104 than geostatistical simulation 1102 representing deterministic random forest. Similarly, a probabilistic quantile random forest 1106 can outperform a deterministic quantile random forest 1108 in the presence of feature uncertainty.

Figure 12:
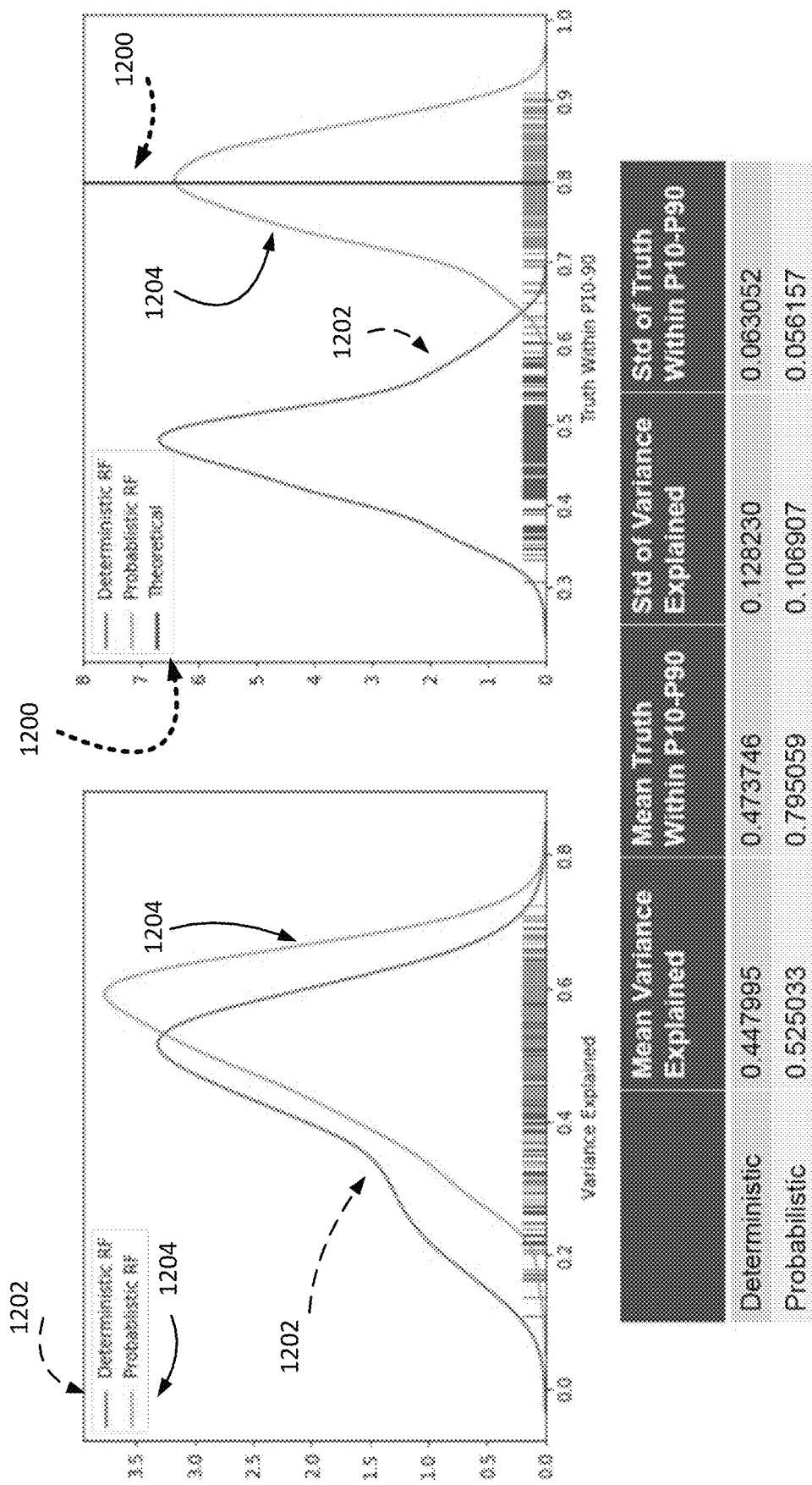
FIG. 12 illustrates an example comparison between theoretical, deterministic random forest regression and probabilistic random forest regression, in accordance with various implementations.

FIG. 12 illustrates an example comparison between theoretical, deterministic random forest regression and probabilistic random forest regression, in accordance with various implementations. Specifically, as provided by the quantified levels of explained variance and truth parameter, probabilistic random forest regression 1204 can demonstrate improved performance relative to deterministic random forest regression 1202. That is, accurately predict geologic features and their corresponding uncertainty. Furthermore, the calculated theoretical truth 1200 can be seen as the mean of the truth of the probabilistic random forest regression. Ultimately, probabilistic random forest regression can explain a greater portion of variance, have a lower standard deviation, and potentially provide a clearer representation of the spatiotemporal data; particularly, in the midst of uncertain or mischaracterized geological parameters.

Figure 13:
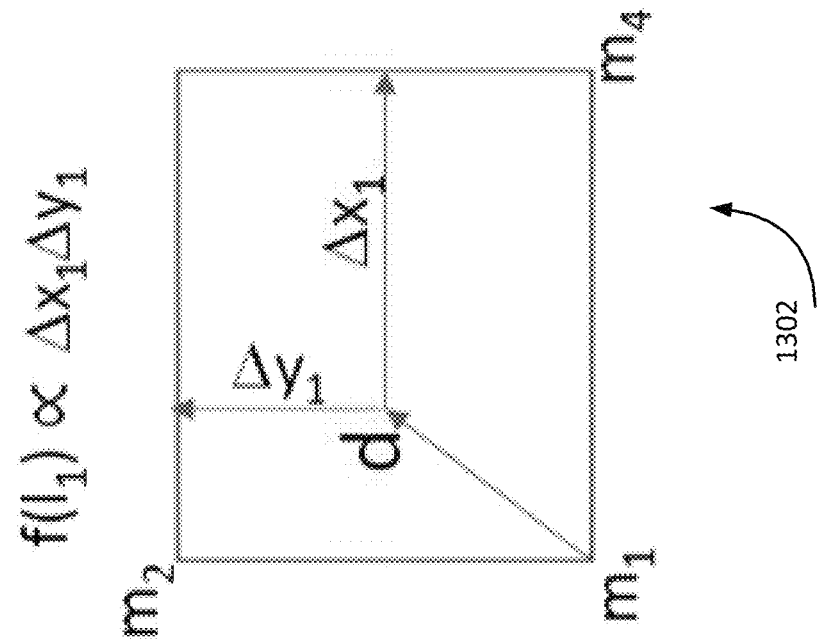
FIG. 13 illustrates an example coarse gridded inversion model of a trend estimation algorithm, in accordance with various implementations.
Figure 13:
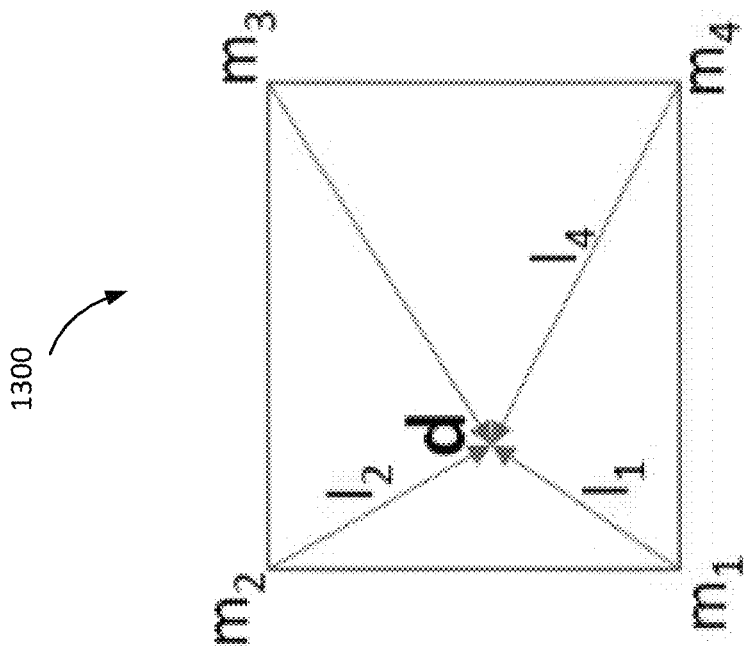

FIG. 13 illustrates an example coarse gridded inversion model of a trend estimation algorithm, in accordance with various implementations. Referring to FIG. 13, the trend estimation algorithm may include coarse grid inversion and bicubic interpolation. Coarse gird inversion may entail solving the model node values $M_{ij}$ for each single geologic property given input data values $D_n$ (i.e., i and j may be coarse grid indices and n may be the data point index). The predicted value at each data location inside a grid cell may be a weighted sum of the model values at the four corners 1300 and 1302. The matrices G, d, and m may include the weighted sum equations for all the input data points. The weighted sum equations can be based on a semivariogram. A semivariogram can be used to find parameters that may reveal the level of spatial continuity in the sampled or observed data. Additionally, least-square inversion may be used to solve for the model values that minimize the prediction error. The data can be predicted according to the equation: $d^{pre}=\Sigma m_i f(l_i)=Gm^{est}$ where $d^{pre}$ can represent predicted data point, $m_i$ can represent the model values, $l_i$ can represent the length, and $Gm^{est}$ can represent the function/operator and estimated model, respectively.

Model smoothness constraints may be added to the least-squares inversion due to coarse grid nodes that are not near input data locations. The addition of smoothness constraints to the coarse gridded model may result in the equation: $m^{est}=[G^TG+\varepsilon^2S]^{-1}G^Td$ where the term $\varepsilon^2S$ can represent a smoothness matrix that regularizes matrix $G^TG$ and stabilizes its inverse. The least squares inversion being $m^{est}=[G^TG]^{-1}G^Td$ where $m^{est}$ can represent the estimated model, G can represent the function used to describe the relationship between the sampled data and the estimated model, and d can represent the predicted data. Based on the estimated model solution, bicubic interpolation may regrid the modified coarse gridded model onto a fine grid.

Figure 14:
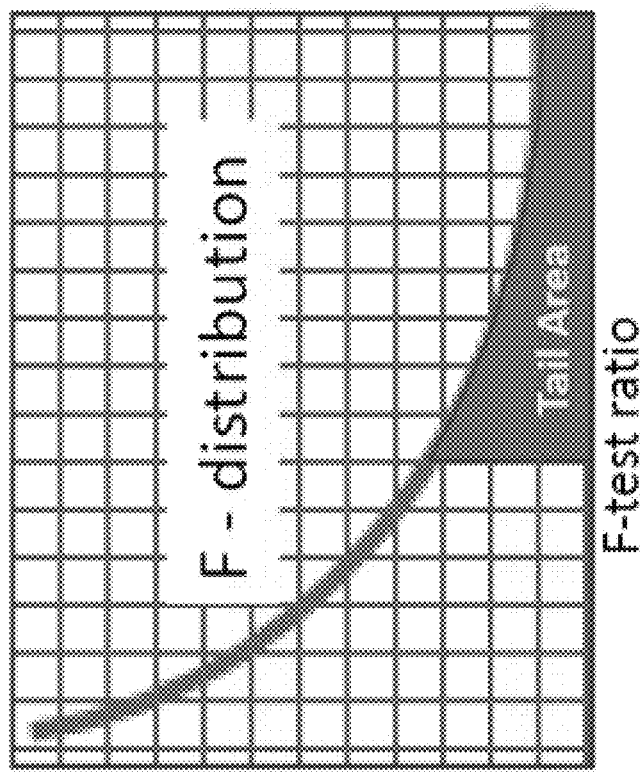
FIG. 14 illustrates a sample F-distribution graph and P-value determination, in accordance with various implementations.

FIG. 14 illustrates an example F-distribution graph and P-value determination, in accordance with various implementations. A F-distribution 1400 may be a continuous probability distribution that can be used to assess variation between several groups and variation within a group. A P-value may refer to the probability that the fit of the model at a data point would be as good or better if all the $N_{eff}$ surrounding data values may be randomized. As illustrated by the shaded area in the F-distribution graph, a P-value can be calculated from the tail area above the F-test ratio. The predicted uncertainty can now be determined based on the P-value and components of variance.

Figure 15:
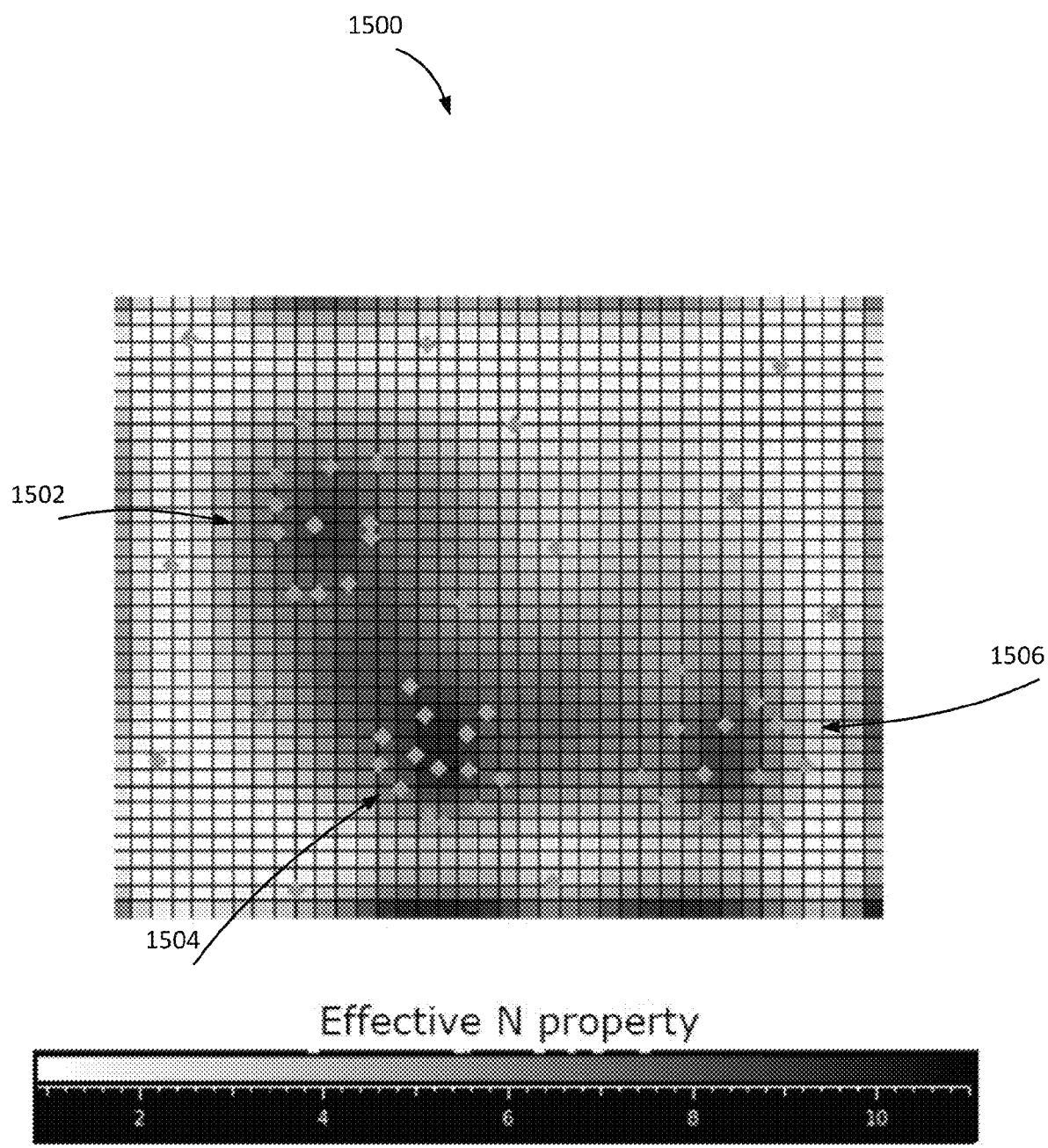
FIG. 15 provides a graph illustrating the relationship between a trace of generalized inverse model resolution matrix and "effective N" ($N_{eff}$), in accordance with various implementations.

FIG. 15 provides a graph illustrating the relationship between a trace of generalized inverse model resolution matrix and "effective N" ($N_{eff}$), in accordance with various implementations. That is, $N_{eff}$ may be equivalent to the trace of the data resolution matrix. Specifically, the obtained model parameters estimates can be described by $$m^{est}=G^{-g}d^{obs}$$

and data predicted from the estimated model may be calculated via $$d^{pre}=Gm^{est}=G[G^{-g}d^{obs}]=[GG^{-g}]d^{obs}=Nd^{obs}.$$

The N×N square matrix $N=GG^{-g}$ may be the data resolution matrix that relates the observed data to the predicted data. As illustrated in the map of well locations 1500, the wells from which the observed data can be sampled are not randomly located but can be distributed such that the distance between neighboring wells varies spatially. $N_{eff}$ can be a measure of this spatial distribution of wells. In this case, the value of $N_{eff}$ is higher at 1502, 1504, and 1506 which can denote the distance between neighboring wells is low and the effective data density is high.

Figure 16:
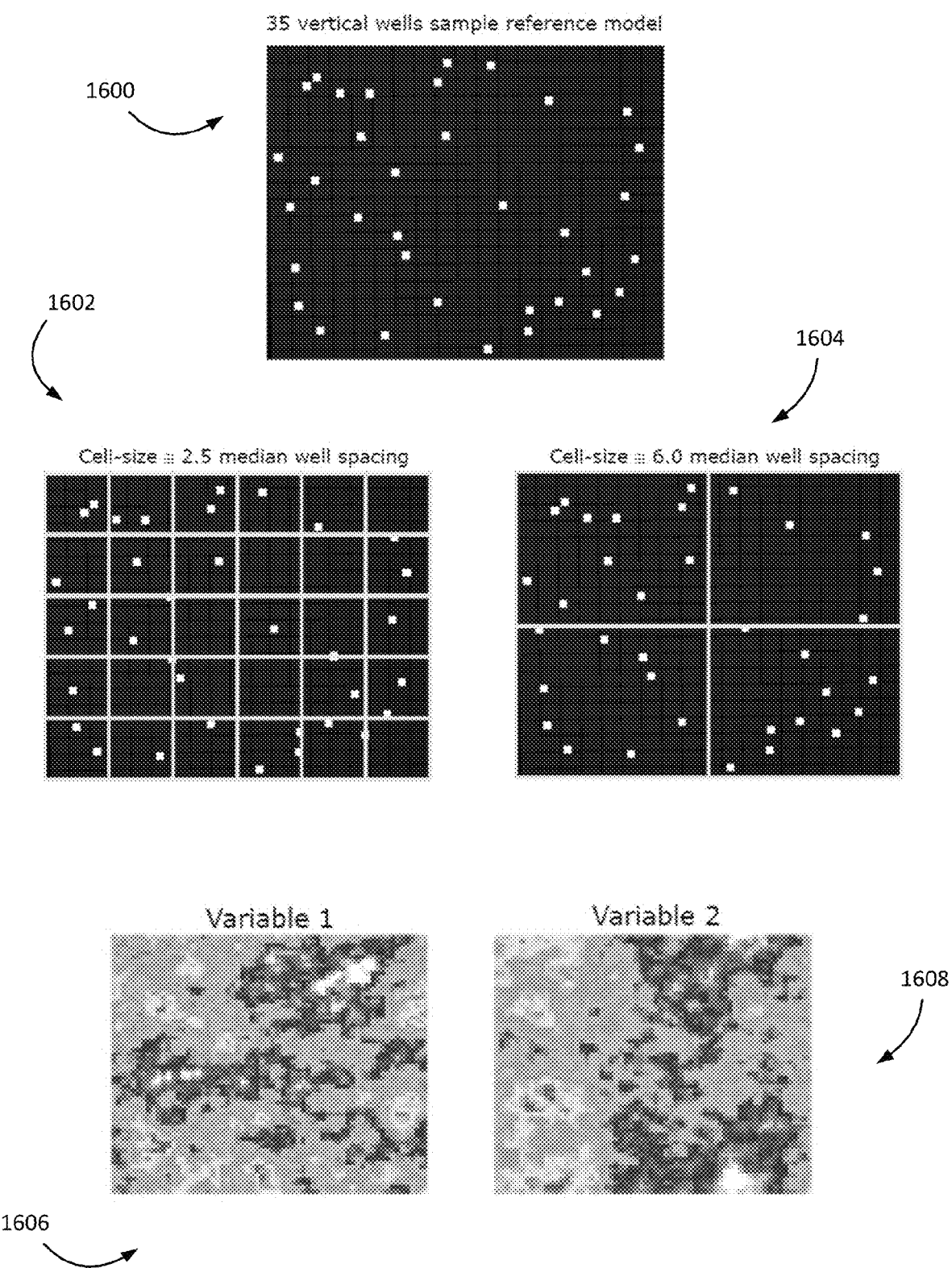
FIG. 16 illustrates a sample reference model, varying resolution models, and two explanatory variables, in accordance with various implementations.

FIG. 16 illustrates a sample reference model, varying resolution models, and two explanatory variables, in accordance with various implementations. A sampling of 35 vertical walls can be used for a reference model 1600. A lower resolution model 1604 with a cell-size of about 6.0 median well spacing and higher resolution model 1602 of about 2.5 median well spacing can then be generated. The models may be used to assess the trend and uncertainty of two arbitrary explanatory variables; specifically, a first explanatory variable 1606 and a second explanatory variable 1608.

Figure 17:
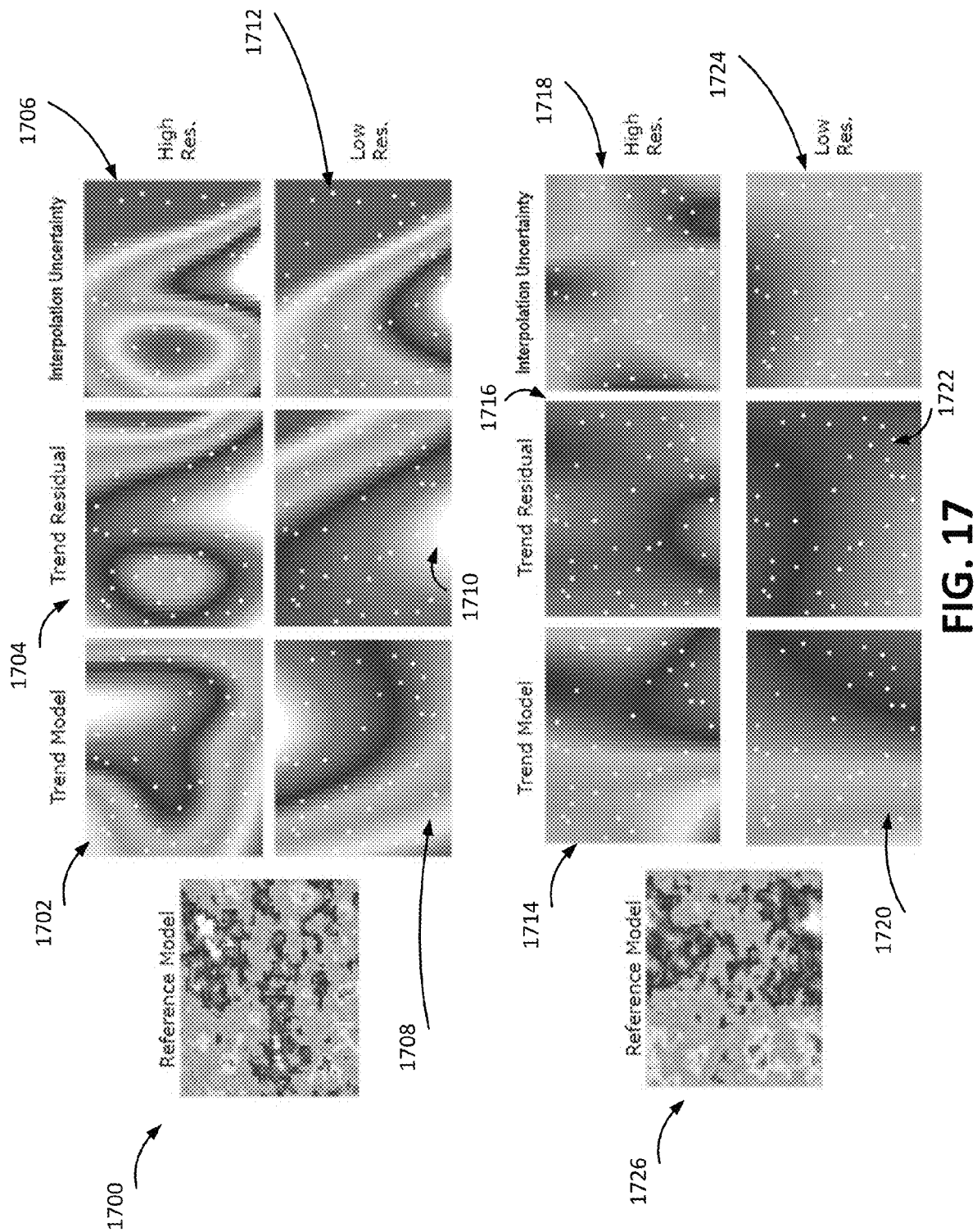
FIG. 17 illustrates trend and uncertainty for the first and second explanatory variable of FIG. 16, in accordance with various implementations.

FIG. 17 illustrates trend and uncertainty for the first 1606 and second 1608 explanatory variables of FIG. 16, in accordance with various implementations. The explanatory variables may be utilized in a trend estimation algorithm and trend estimation uncertainty algorithm to determine a respective trend and trend uncertainty. The first variable 1606 may be represented by geostatistical simulations 1702-1712 and the second variable 1608 may be represented by geostatistical simulations 1714-1726. The trend and uncertainty for the first variable can be compared to the reference model 1700 to evaluate performance in higher resolution and lower resolution models. Similarly, the trend and uncertainty for the second variable can be compared to the reference model 1726 to evaluate performance in higher resolution and lower resolution models. As shown, the cell-size can have an impact on the performance of geostatistical simulations. That is, higher resolution models can provide a more accurate and detailed depiction of subsurface volumes of interest.

Figure 18:
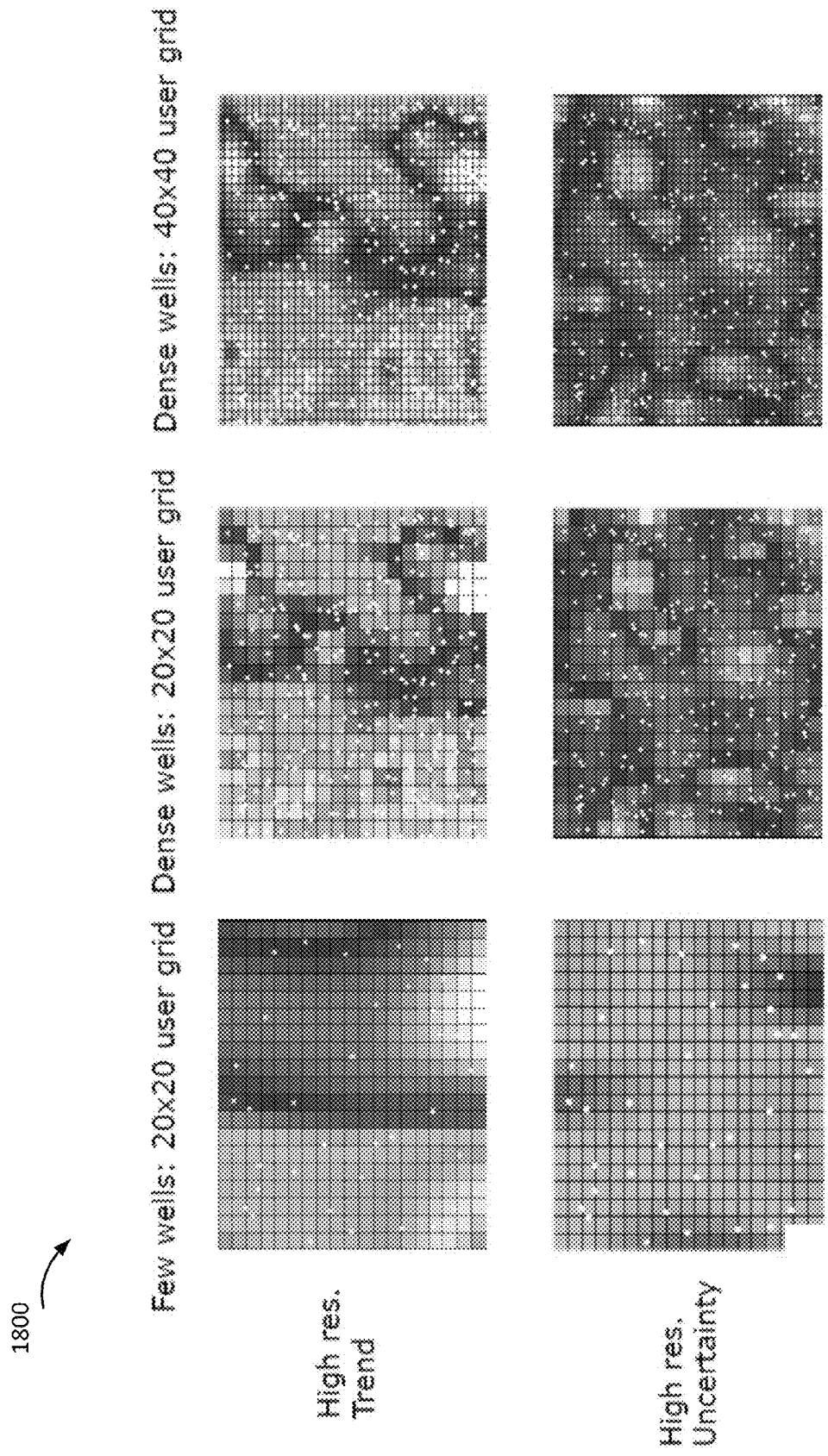
FIG. 18 illustrates the effects of increased well density and number of user grid cells, in accordance with various implementations.

FIG. 18 illustrates the effects of increased well density and number of user grid cells, in accordance with various implementations. Generally, as well density increases the number of user grid cells also increases. Moreover, the geostatistical simulation 1800 of the subsurface volume of interest improves dramatically as the number of user grid cells increases.

Figure 19:
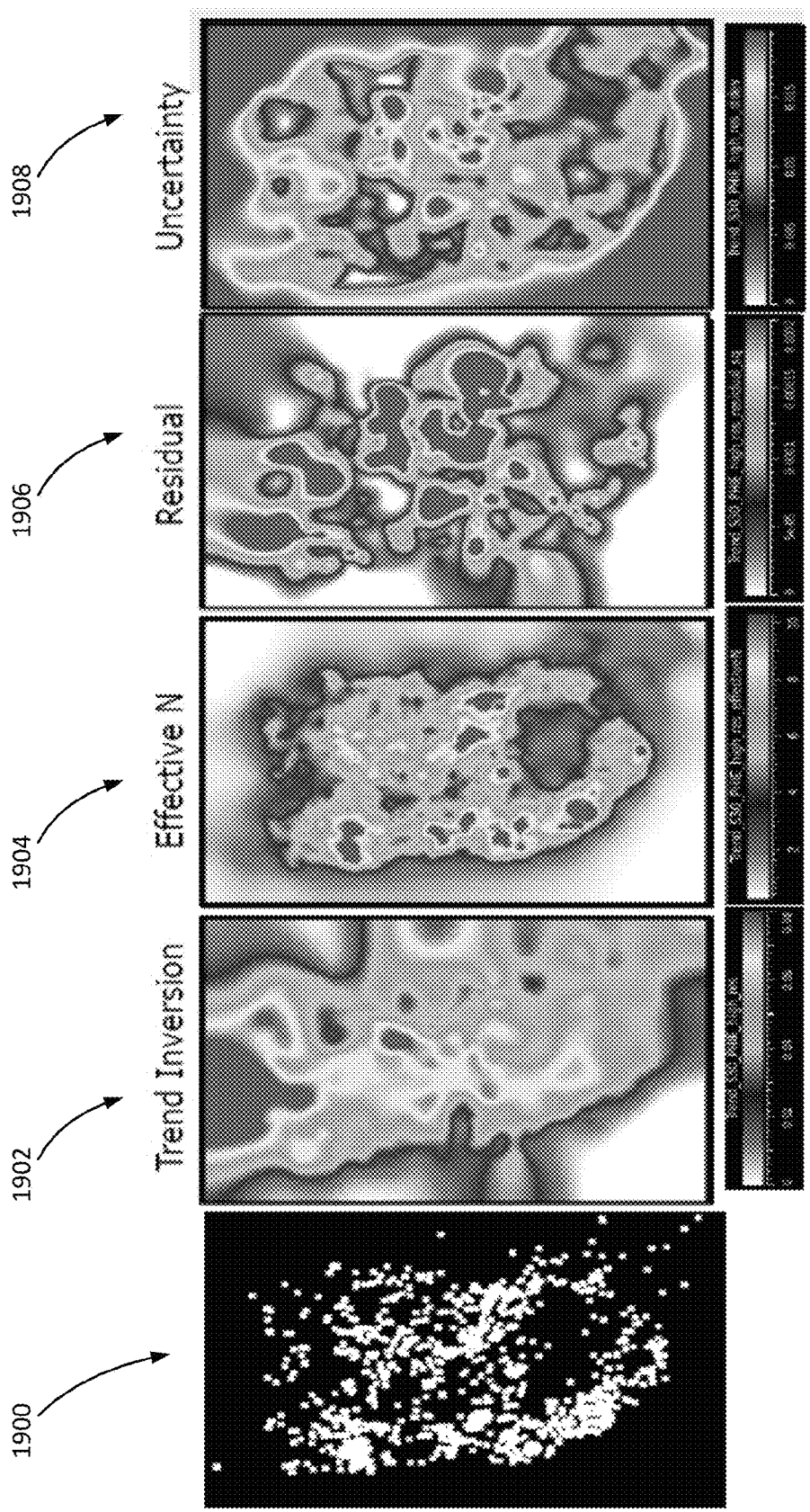
FIG. 19 illustrates maps of trend and uncertainty for porosity (PHIE) in a subsurface volume interest, in accordance with various implementations.

FIG. 19 illustrates maps of trend and uncertainty for porosity (PHIE) in a subsurface volume interest, in accordance with various implementations. The maps can depict a reference model of well locations 1900, trend inversion 1902, effective N 1904, residual variance 1906, and uncertainty or standard deviation 1908 for a sample location's porosity.

Figure 20:
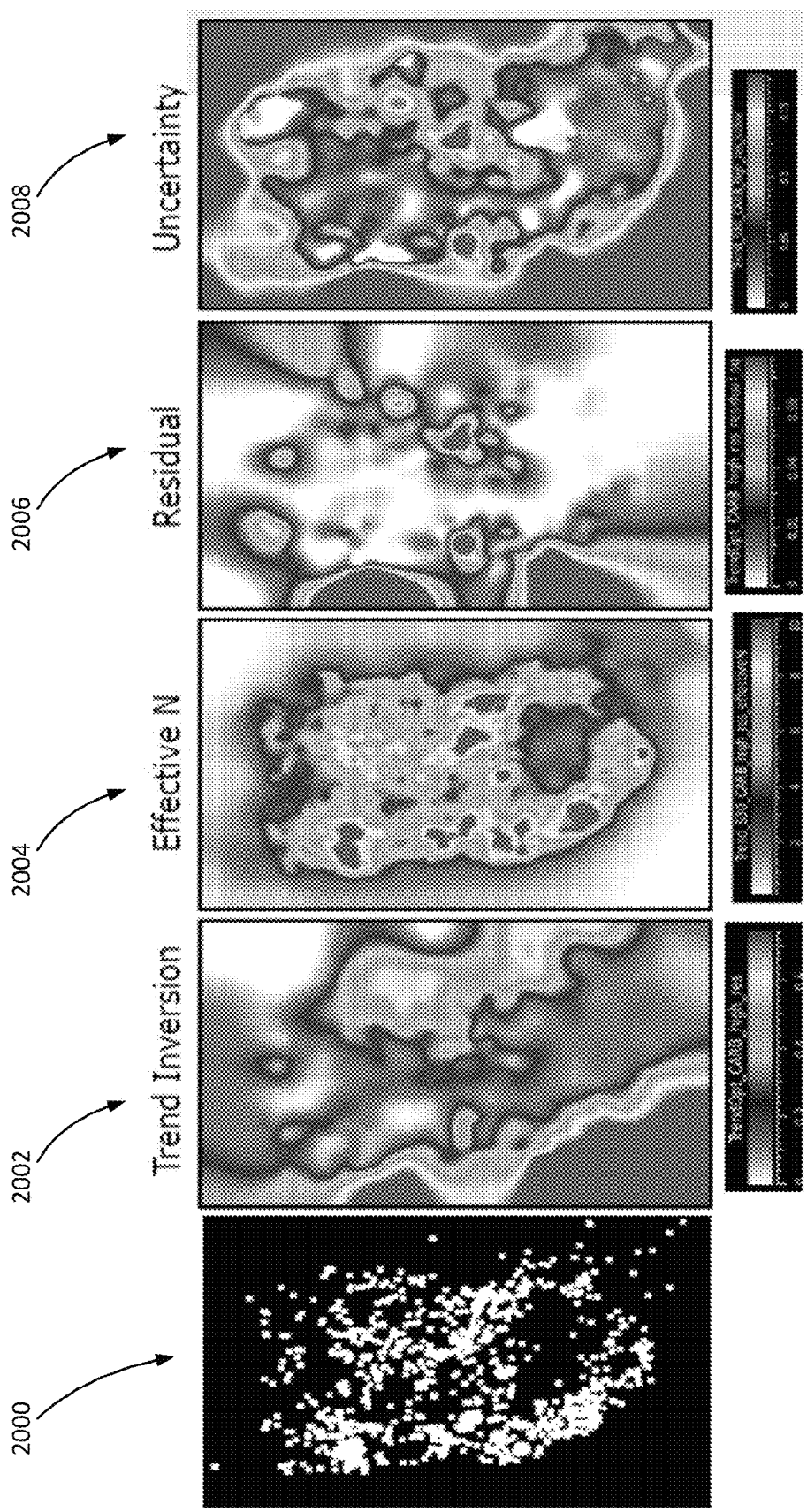
FIG. 20 illustrates maps of trend and uncertainty for carbonate content (CARB) in a subsurface volume of interest, in accordance with various implementations.

FIG. 20 illustrates maps of trend and uncertainty for carbonate content (CARB) in the subsurface volume of interest in FIG. 19, in accordance with various implementations. The maps can depict a reference model of well locations 2000, trend inversion 2002, effective N 2004, residual variance 2006, and uncertainty or standard deviation 2008 for sample location's carbonate content.

FIGS. 19 and 20 can represent a higher resolution application of the trend estimation algorithm and the trend uncertainty algorithm as applied to the sample variables of porosity and carbonate content in a subsurface volume of interest. The geostatistical simulations provide improved estimates of porosity and carbonate content in the same sample subsurface volume of interest that have previously been unachievable using traditional techniques.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended Claims. For example, it is to be understood that the present technology contemplates that, to the extent possible, one or more features of any implementation can be combined with one or more features of any other implementation.

While particular implementations are described above, it will be understood it is not intended to limit the presently disclosed technology to these particular implementations. On the contrary, the presently disclosed technology includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

The terminology used in the description of the presently disclosed technology herein is for the purpose of describing particular implementations only and is not intended to be limiting of the presently disclosed technology. As used in the description of the presently disclosed technology and the appended claims, the singular forms "a," "an," and "the" are intended to include the plural forms as well, unless the context clearly indicates otherwise. It will be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the presently disclosed technology to the precise forms disclosed. Many modifications and variations are possible in view of the above teachings. The implementations were chosen and described in order to best explain the principles of the presently disclosed technology and its practical applications, to thereby enable others skilled in the art to best utilize the presently disclosed technology and various implementations with various modifications as are suited to the particular use contemplated.

What is claimed is:

1. A computer-implemented method for training a model using stochastic input parameters for predicting hydrocarbon production and hydrocarbon production uncertainty in a subsurface volume of interest, the method being implemented in a computer system that includes one or more physical computer processors, non-transient electronic storage, and a graphical user interface, the method comprising:
    obtaining, via the graphical user interface, (i) training production data, corresponding to the subsurface volume of interest, (ii) training engineering parameters, corresponding to the subsurface volume of interest, and (iii) a training set of geological parameters and corresponding training geological parameter uncertainty values, corresponding to the subsurface volume of interest;
    obtaining an initial production model;
    applying the training production data, the training engineering parameters, and the training set of geological parameters and corresponding training geological parameter uncertainty values to the initial production model via the graphical user interface;
    training the initial production model by using the training data;
    generating a trained production model; and
    storing the trained production model.

2. The computer-implemented method of claim 1, wherein the training set of geological parameters comprises at least one of carbonate content, porosity, and silica content corresponding to the subsurface volume of interest.

3. The computer-implemented method of claim 1, wherein the training production data comprises at least one of cumulative oil production, historical oil production, cumulative gas production, historical gas production, and cumulative oil production at a plurality of different time intervals.

4. The computer-implemented method of claim 1, further comprising:
    determining the training set of geological parameters and corresponding training geological parameter uncertainty values, corresponding to the subsurface volume of interest;
    performing a coarse grid inversion to generate a coarse gridded model via data from the subsurface volume of interest;
    interpolating the coarse gridded model to generate a fine gridded model and the set of geological parameters; and
    determining a predicted uncertainty of the set of geological parameters based on a P-value calculation of the fine gridded model to generate the training geological parameter uncertainty values.

5. The computer-implemented method of claim 2, wherein the training set of geological parameters further comprises an expected trend value and a statistical uncertainty of the set of geological parameters interpolated from nearby measured geologic parameter data to the collated spatial location of the production data.

6. The computer-implemented method of claim 4, wherein the coarse gridded model comprises:

$$m^{est}=[G^TG+\varepsilon^2S]^{-1}G^Td=G^{-g}d$$

and interpolating the coarse gridded model comprises bicubic interpolation.

7. A computer-implemented method for applying a model for predicting hydrocarbon production and hydrocarbon production uncertainty in a subsurface volume of interest, the method being implemented in a computer system that includes one or more physical computer processors, non-transient electronic storage, and a graphical user interface, the method comprising:
    obtaining, via the graphical user interface, a target set of geological parameters and corresponding target geological parameter uncertainty values;
    obtaining, via the graphical user interface, target engineering parameters;
    obtaining a trained production model, the trained production model having been trained by training an initial production model, wherein the training data includes training production data, corresponding to the subsurface volume of interest, (ii) training engineering parameters, corresponding to the subsurface volume of interest, and (iii) a training set of geological parameters and corresponding training geological parameter uncertainty values, corresponding to the subsurface volume of interest;
    applying the trained production model to the target set of geological parameters, corresponding target geological parameter uncertainty values, and target engineering parameters, via the graphical user interface, to generate a set of production values and corresponding production uncertainty values;

generating a representation using visual effects to depict at least a portion of the set of production values and corresponding production uncertainty values as a function of position within the subsurface volume of interest; and displaying the representation.

8. The computer-implemented method of claim 7, wherein the target set of geological parameters and corresponding target geological parameter uncertainty values comprises:
calculating a geological parameter trend and a geological parameter tread uncertainty of the target set of geological parameters by interpolating the training set of geological parameters corresponding to the subsurface volume of interest; and
wherein the training set of geological parameters is based on sampled well data.

9. The computer-implemented method of claim 8, wherein calculating the geological parameter trend comprises:
calculating an inversion model via a generalized least-square inversion using the equation, d=Gm;
wherein m comprises trend values at gridded locations;
d comprises geological parameter data; and G comprises a matrix including the equations for an estimate of each gridded model location as a distance weighted sum of neighboring data.

10. The computer-implemented method of claim 7, wherein the target engineering parameters comprise at least one of well length, injected proppant, drilling properties, wellbore configurations, fluid types, and well spacing at a new location in the subsurface volume of interest.

11. The computer-implemented method of claim 8, wherein calculating the geological parameter trend uncertainty comprises:
determining a P-value, residual and total variance, F-test ratio and $N_{eff}$ computed in the inversion model.

12. The computer-implemented method of claim 7, wherein applying the trained production model comprises:
analyzing each node of the trained production model and corresponding uncertainty; and
predicting the set of production values and corresponding production uncertainty values.

13. The computer-implemented method of claim 7, wherein applying the target set of geological parameters and corresponding target geological parameter uncertainty values comprises:
applying a geological parameter trend and a statistical uncertainty of the target set of geological parameters corresponding to the new location in the subsurface volume of interest to the trained production model to generate the set of production values and the corresponding production uncertainty values.

14. A computer system for training and applying a model for predicting hydrocarbon production and hydrocarbon production uncertainty in a subsurface volume of interest, the system comprising:
one or more physical computer processors,
non-transient electronic storage,
a graphical user interface;
memory; and
one or more programs, wherein the one or more programs are stored in the memory and configured to be executed by the one or more physical computer processors, the one or more programs including instructions that when executed by the one or more physical computer processors cause the system to:

obtain, via the graphical user interface, (i) training production data, corresponding to the subsurface volume of interest, (ii) training engineering parameters, corresponding to the subsurface volume of interest, and (iii) a training set of geological parameters and corresponding training geological parameter uncertainty values, corresponding to the subsurface volume of interest;
obtain an initial production model;
apply the training production data, the training engineering parameters, and the training set of geological parameters and corresponding training geological parameter uncertainty values to the initial production model via the graphical user interface;
train the initial production model by using the training data;
generate a trained production model;
store the trained production model;
obtain, via the graphical user interface, a target set of geological parameters and corresponding target geological parameter uncertainty values;
obtain, via the graphical user interface, target engineering parameters;
apply the target set of geological parameters, corresponding target geological parameter uncertainty values, and target engineering parameters to the trained production model, via the graphical user interface, to generate a set of production values and corresponding production uncertainty values;
generate a representation using visual effects to depict at least a portion of the set of production values and corresponding production uncertainty values as a function of position within the subsurface volume of interest; and
display the representation.

15. The system of claim 14, further comprising:
calculating a P-value, residual and total variance, F-test ratio, and $N_{eff}$ based on the training geological parameters.

16. The system of claim 15, wherein the P-value is calculated from the tail area above the F-test ratio; the F-test ratio comprises:

$$F\text{-test Ratio} = \frac{(N_{eff} - 1)(variance_{explained})}{variance_{residual}}$$

and the $N_{eff}$ comprises $$N_{eff} = d^{pre} = Nd^{obs} \text{ with } N = GG^{-g}.$$

17. The system of claim 14, wherein the training geological parameter uncertainty values and the target geological parameter uncertainty values comprise:

$$\text{Predicted Uncertainty} = \sqrt{(P_{value} * variance_{total} + (1 - P_{value}) * variance_{residual})}$$

18. The system of claim 14, wherein the initial production model and the trained production model comprise a machine learning probabilistic random forest regression.

19. The system of claim 18, wherein training the machine learning probabilistic random forest comprises:
formulating a cost function in view of training parameter uncertainty values; and generating a tree structure, wherein the tree structure comprises one or more nodes corresponding to one or more levels of the tree structure, and wherein traversing to each terminal node of the one or more nodes is based on a probability determined by the cost function.

20. The system of claim 19, wherein the cost function for determining the optimal splitting threshold for a feature k comprises:

$$PRSS(T, k) = \sum_{i=0}^{N} \int_{-\infty}^{T} (y_i - \bar{y}_l)^2 N(x_i^k, \sigma_i^k) dx + \int_{T}^{+\infty} (y_i - \bar{y}_u)^2 N(x_i^k, \sigma_i^k) dx.$$

* * * * *